US009727309B2

(12) United States Patent
Ozawa et al.

(10) Patent No.: US 9,727,309 B2
(45) Date of Patent: Aug. 8, 2017

(54) COMPUTER-READABLE RECORDING MEDIUM, ENCODING APPARATUS, AND ENCODING METHOD

(71) Applicant: FUJITSU LIMITED, Kawasaki-shi, Kanagawa (JP)

(72) Inventors: Takaki Ozawa, Numazu (JP); Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/995,640

(22) Filed: Jan. 14, 2016

(65) Prior Publication Data

US 2016/0210120 A1 Jul. 21, 2016

(30) Foreign Application Priority Data

Jan. 19, 2015 (JP) ................................. 2015-008144

(51) Int. Cl.
*G06F 7/483* (2006.01)

(52) U.S. Cl.
CPC .................................... *G06F 7/483* (2013.01)

(58) Field of Classification Search
CPC ...................................................... G06F 7/483
See application file for complete search history.

(56) References Cited

U.S. PATENT DOCUMENTS

| | | | | |
|---|---|---|---|---|
| 5,822,233 | A | 10/1998 | Kawasaki | |
| 7,554,464 | B1 * | 6/2009 | Oberdorfer | H03M 7/30 341/55 |
| 2006/0106909 | A1 * | 5/2006 | Howard | G06F 7/026 708/495 |
| 2016/0062954 | A1 * | 3/2016 | Ruff | G06F 17/21 715/249 |

FOREIGN PATENT DOCUMENTS

| | | |
|---|---|---|
| JP | 4-222122 | 8/1992 |
| JP | 8-129479 | 5/1996 |

* cited by examiner

*Primary Examiner* — Chuong D Ngo
(74) *Attorney, Agent, or Firm* — Oblon, McClelland, Maier & Neustadt, L.L.P.

(57) ABSTRACT

An encoding apparatus detects a bit repeating portion in a mantissa part bit string. The mantissa part bit string is a part of a bit string of a floating point number and corresponds to a mantissa of the floating point number. The floating point number has a sign, an exponent, and the mantissa. The bit repeating portion includes repetitions of a particular bit pattern up to a tail of the mantissa part bit string. The encoding apparatus encodes the bit string of the floating point number into a converted bit string with a first part bit string and a second part bit string. The first part bit string includes a sign part bit string, an exponent part bit string, and a part of the mantissa part bit string that exclude a bit string portion after a secondary repetition of the particular bit pattern. The second part bit string specifies the particular bit pattern in the first part bit string.

8 Claims, 11 Drawing Sheets

1.1 = (-1)^0[SIGN] * (1 + 0.1[MANTISSA PART]) * 2^(127[EXPONENT PART] - 127)

SIGN PART a1 | EXPONENT PART a2 | MANTISSA PART a3 | 23 BITS

COMPRESSION FLAG b1 | SIGN PART b2 | EXPONENT PART b3 | CYCLE NUMBER PART b4 | FINITE MANTISSA PART b51 | REPETEND PART b52 | CYCLIC MANTISSA PART b5 | 4 BITS | 10 BITS b1 | b2 | b3 | SHORTENED MANTISSA PART c1 | 22 BITS 1.1 = (-1)^0[SIGN] * (1 + 0.1[MANTISSA PART]) * 2^(127[EXPONENT PART] - 127)
SIGN PART
a1
EXPONENT PART
a2
MANTISSA PART
a3
23 BITS
COMPRESSION FLAG
b1
SIGN PART
b2
EXPONENT PART
b3
CYCLE NUMBER PART
b4
FINITE MANTISSA PART
b51
REPETEND PART
b52
CYCLIC MANTISSA PART
b5
4 BITS
10 BITS
b1
b2
b3
SHORTENED MANTISSA PART
c1
22 BITS

-1945.6 = (- 1)^1[SIGN] * (1 + 0.9[MANTISSA PART]) * 2^(137[EXPONENT PART] - 127)
SIGN PART
a1
EXPONENT PART
a2
MANTISSA PART
a3
52 BITS
COMPRES-
SION FLAG
b1
SIGN
PART
b2
EXPONENT PART
b3
CYCLE
NUMBER
PART
b4
FINITE
MANTISSA
PART
b51
REPETEND
PART
b52
CYCLIC MANTISSA PART
b5
4
BITS
15 BITS
b1
b2
b3
SHORTENED MANTISSA PART
c1
51 BITS

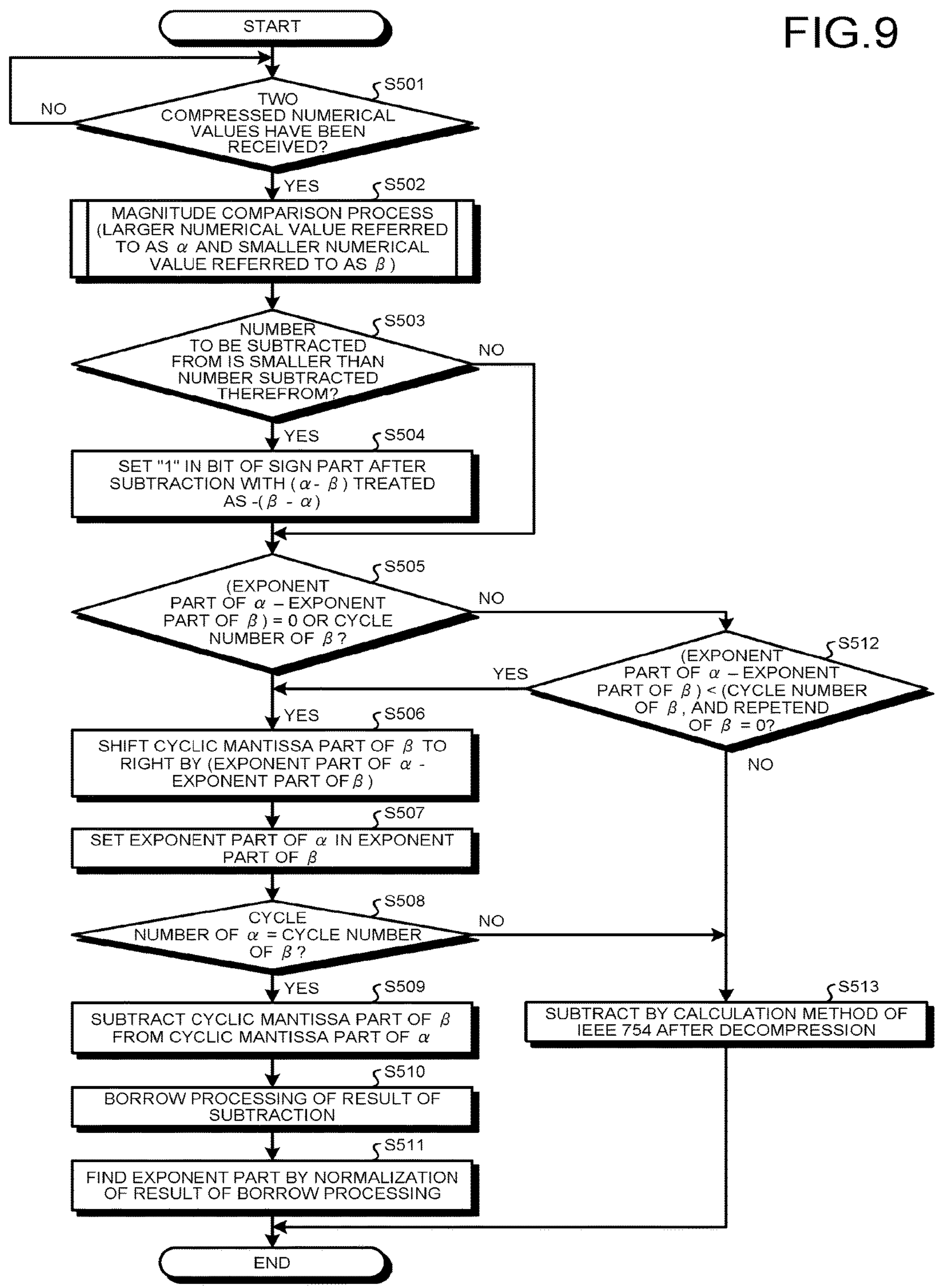
FIG.9
START
TWO COMPRESSED NUMERICAL VALUES HAVE BEEN RECEIVED?
S501
NO
YES
S502
MAGNITUDE COMPARISON PROCESS (LARGER NUMERICAL VALUE REFERRED TO AS α AND SMALLER NUMERICAL VALUE REFERRED TO AS β)
S503
NUMBER TO BE SUBTRACTED FROM IS SMALLER THAN NUMBER SUBTRACTED THEREFROM?
NO
YES
S504
SET "1" IN BIT OF SIGN PART AFTER SUBTRACTION WITH (α - β) TREATED AS -(β - α)
S505
(EXPONENT PART OF α – EXPONENT PART OF β) = 0 OR CYCLE NUMBER OF β?
NO
S512
(EXPONENT PART OF α – EXPONENT PART OF β) < (CYCLE NUMBER OF β, AND REPETEND OF β = 0?
YES
NO
YES
S506
SHIFT CYCLIC MANTISSA PART OF β TO RIGHT BY (EXPONENT PART OF α - EXPONENT PART OF β)
S507
SET EXPONENT PART OF α IN EXPONENT PART OF β
S508
CYCLE NUMBER OF α = CYCLE NUMBER OF β?
NO
YES
S509
SUBTRACT CYCLIC MANTISSA PART OF β FROM CYCLIC MANTISSA PART OF α
S513
SUBTRACT BY CALCULATION METHOD OF IEEE 754 AFTER DECOMPRESSION
S510
BORROW PROCESSING OF RESULT OF SUBTRACTION
S511
FIND EXPONENT PART BY NORMALIZATION OF RESULT OF BORROW PROCESSING
END 300
312
301
PROCESSOR
302
RAM
303
ROM
304
DRIVE DEVICE
305
STORAGE MEDIUM
306
INPUT I/F
307
INPUT DEVICE
308
OUTPUT I/F
309
OUTPUT DEVICE
310
COMMUNICA-TION I/F
311
SAN I/F
400

COMPUTER-READABLE RECORDING MEDIUM, ENCODING APPARATUS, AND ENCODING METHOD

CROSS-REFERENCE TO RELATED APPLICATION(S)

This application is based upon and claims the benefit of priority of the prior Japanese Patent Application No. 2015-008144, filed on Jan. 19, 2015, the entire contents of which are incorporated herein by reference.

FIELD

The embodiments discussed herein are related to a computer-readable recording medium having stored therein an encoding program, and the like.

BACKGROUND

Numeric types with large bit numbers handled on computers include single precision floating point number format (32 bits) and double precision floating point number format (64 bits), which are prescribed in IEEE 754. A single precision floating point number is formed of a sign of one bit, an exponent part of eight bits, and a mantissa part of 23 bits. A double precision floating point number is formed of a sign of one bit, an exponent part of eleven bits, and a mantissa part of 52 bits.

In recent years, since performance of CPUs has improved and cost of input and output with respect to disks has become a problem, an amount of information treatable in a single input and output operation with respect to a disk is desirably increased. For floating point numbers prescribed in IEEE 754 also, by compression with a known technique, an amount of information treatable in a single input and output operation with respect a disk is able to be increased (see Japanese Laid-open Patent Publication No. 08-129479, for example).

However, compression by a known technique has a problem that the same calculation as that before the compression is difficult due to the compressed signs.

SUMMARY

According to an aspect of an embodiment, a non-transitory computer-readable recording medium has stored therein an encoding program. The encoding program causes a computer to execute a process. The process includes: detecting a bit repeating portion in a mantissa part bit string, the mantissa part bit string being a part of a bit string of a floating point number and corresponding to a mantissa of the floating point number, the floating point number having a sign, an exponent, and the mantissa, the bit repeating portion including repetitions of a particular bit pattern up to a tail of the mantissa part bit string; and encoding the bit string of the floating point number into a converted bit string with a first part bit string and a second part bit string, the first part bit string including a sign part bit string, an exponent part bit string, and a part of the mantissa part bit string that exclude a bit string portion after a secondary repetition of the particular bit pattern; the second part bit string specifying the particular bit pattern in the first part bit string.

According to another aspect of an embodiment, an encoding apparatus includes a detecting unit and an executing unit. The detecting unit detects a bit repeating portion in a mantissa part bit string, the mantissa part bit string being a part of a bit string of a floating point number and corresponding to a mantissa of the floating point number, the floating point number having a sign, an exponent, and the mantissa, the bit repeating portion including repetitions of a particular bit pattern up to a tail of the mantissa part bit string. The executing unit encodes the bit string of the floating point number into a converted bit string with a first part bit string and a second part bit string, the first part bit string including a sign part bit string, an exponent part bit string, and a part of the mantissa part bit string that exclude a bit string portion after a secondary repetition of the particular bit pattern; the second part bit string specifying the particular bit pattern in the first part bit string.

According to still another aspect of an embodiment, an encoding method includes: detecting, by a computer, a bit repeating portion in a mantissa part bit string, the mantissa part bit string being a part of a bit string of a floating point number and corresponding to a mantissa of the floating point number, the floating point number having a sign, an exponent, and the mantissa, the bit repeating portion including repetitions of a particular bit pattern up to a tail of the mantissa part bit string; and encoding, by a computer, the bit string of the floating point number into a converted bit string with a first part bit string and a second part bit string, the first part bit string including a sign part bit string, an exponent part bit string, and a part of the mantissa part bit string that exclude a bit string portion after a secondary repetition of the particular bit pattern; the second part bit string specifying the particular bit pattern in the first part bit string.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flow chart illustrating a procedure by a subtracting unit according to the embodiment;

DESCRIPTION OF EMBODIMENT(S)

Preferred embodiments of the present invention will be explained with reference to accompanying drawings. The invention is not limited by these embodiments.

Figure 1:
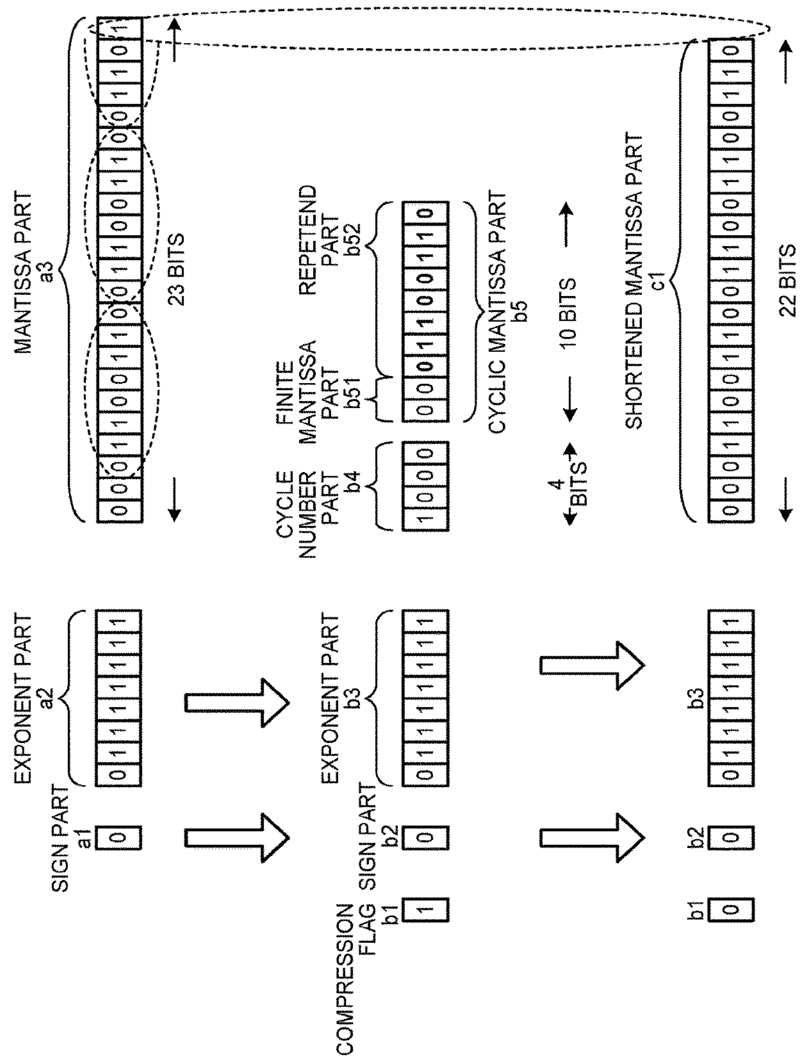
FIG. 1 is a diagram illustrating a compression process of a single precision floating point number according to an embodiment.

FIG. 1 is a diagram illustrating a compression process of a single precision floating point number according to an embodiment.

As illustrated in a top portion of FIG. 1, a single precision floating point number prescribed in IEEE 754 is represented by four bytes, and is formed of a sign part a1 formed of one bit, an exponent part a2 formed of eight bits, and a mantissa part a3 formed of 23 bits. In the sign part a1, 0 represents a positive number and 1 represents a negative number. The exponent part a2 is expressed by an expression inflated by 127 for single precision, as an unsigned binary integer. In the mantissa part a3, a value of a fraction part below an integer part is expressed by a binary number.

For example, a decimal numerical value, 1.1, is expressed as $(-1)^{0(number\ 1)}*(1+0.1\ (number\ 2))*2^{(127(number\ 3)-127)}$ In (number 1), a value expressed in the sign part al is set in decimal notation, and 0 is set therein in this example. In (number 2), a value expressed in the fraction part a3 is set in decimal notation, and 0.1 is set therein in this example. In (number 3), a value expressed in the exponent part a2 is set in decimal notation, and 127 is set therein in this example. The single precision floating point number expresses decimal notation of (number 1), (number 2), and (number 3) in binary notation, respectively for the sign part a1, the exponent part a2, and the mantissa part a3. A value of the least significant bit of the mantissa part a3 has a value of a subsequent bit being carried up therein.

In the compression process according to this embodiment, such a single precision floating point number is compressed. In the compression process, a cyclic pattern is extracted from the mantissa part a3 of a bit string representing a numerical value of a single precision floating point number. A cyclic pattern is a pattern having the same numerical string that is cyclically repeated. In the compression process, if a cyclic pattern is extracted, the mantissa part a3 is prescribed by the cyclic pattern and a cycle number indicating a bit number of the cyclic pattern. In the compression process, by use of the prescribed cyclic pattern and cycle number, the mantissa part a3 is compressed.

As illustrated in a middle portion of FIG. 1, when the mantissa part a3 is compressed, the single precision floating point number is represented by three bytes. The single precision floating point number is formed of a compression flag b1 formed of one bit, a sign part b2 formed of one bit, an exponent part b3 formed of eight bits, a cycle number part b4 formed of four bits, and a cyclic mantissa part b5 formed of ten bits. A configuration that is the same as the configuration of the single precision floating point number prescribed in IEEE 754 illustrated in the top portion of FIG. 1 is the sign part b2 and the exponent part b3. A configuration that is different from that of the single precision floating point number prescribed in IEEE 754 is the compression flag b1, the cycle number part b4, and the cyclic mantissa part b5.

The compression flag b1 is a flag indicating whether or not the single precision floating point number has been compressed. For example, in the compression flag b1, 1 is set if the single precision floating point number has been compressed, and 0 is set if the single precision floating point number has not been compressed. In the cycle number part b4, a cycle number indicating a bit number of the cyclic pattern is set. The cyclic mantissa part b5 is formed of a finite mantissa part b51 and a repetend part b52. In the finite mantissa part b51, a bit string previous to a start of the cyclic pattern of the mantissa part a3 is set. In the repetend part b52, a bit string of the cyclic pattern is set. Since the bit string of the cyclic pattern corresponding to the cycle number set in the cycle number part b4 is set in the repetend part b52, the cycle number part b4 can be said to be a bit string identifying where the bit string corresponding to the repetend part b52 is in the cyclic mantissa part b5. Since the cycle number part b4 is four bits and the cyclic mantissa part b5 is ten bits, the cycle number part b4 is able to express the largest bit number, 10 (0b1010) of the cyclic pattern expressed by the cyclic mantissa part b5.

Processing in a case where a cyclic pattern, "01100110", has been extracted from the mantissa part a3 in the compression process will now be described. In the compression process, values of the sign part a1 and the exponent part a2 are respectively set in the sign part b2 and the exponent part b3. In the compression process, "1000", which is a binary representation of 8, which is the bit number of the cyclic pattern, is set in the cycle number part b4. In the compression process, "01100110", which is the bit string of the cyclic pattern, is set in the repetend part b52. In the compression process, "00", which is the bit string previous to the start of the cyclic pattern, is set in the finite mantissa part b51. In the compression process, "1", which indicates that the single precision floating point number is compressed, is then set in the compression flag b1. Thereby, by the compression process, the single precision floating point number is able to be shortened from four bytes to three bytes.

As illustrated in a lower portion of FIG. 1, the single precision floating point number is represented by four bytes if the mantissa part a3 is not compressed. The single precision floating point number is formed of the compression flag b1 formed of one bit, the sign part b2 formed of one bit, the exponent part b3 formed of eight bits, and a shortened mantissa part c1 formed of 22 bits. By illustration with the same reference signs for a configuration that is the same as the configuration of the single precision floating point number compressed as illustrated in the middle portion of FIG. 1, description of the redundant configuration will be omitted. A configuration different from the configuration of the single precision floating point number that is compressed is the shortened mantissa part c1. The shortened mantissa part c1 has the least significant bit of the mantissa part a3 dropped off.

In this example, processing in a case where a cyclic pattern is not extracted from the mantissa part a3 by the compression process will be described. In the compression process, the values of the sign part a1 and the exponent part a2 are respectively set in the sign part b2 and the exponent part b3. In the compression process, since a cyclic pattern is not extracted from the mantissa part a3, a bit string with the least significant bit of the mantissa part a3 having been dropped off is set in the shortened mantissa part c1. In the compression process, "0", which indicates that the single precision floating point number is not compressed, is then set in the compression flag b1. Thereby, in the compression process, even if the single precision floating point number is unable to be compressed, since a configuration shifted from the IEEE 754 format to the right by one bit is obtained, compatibility with the IEEE 754 format is able to be maintained.

Figure 2:
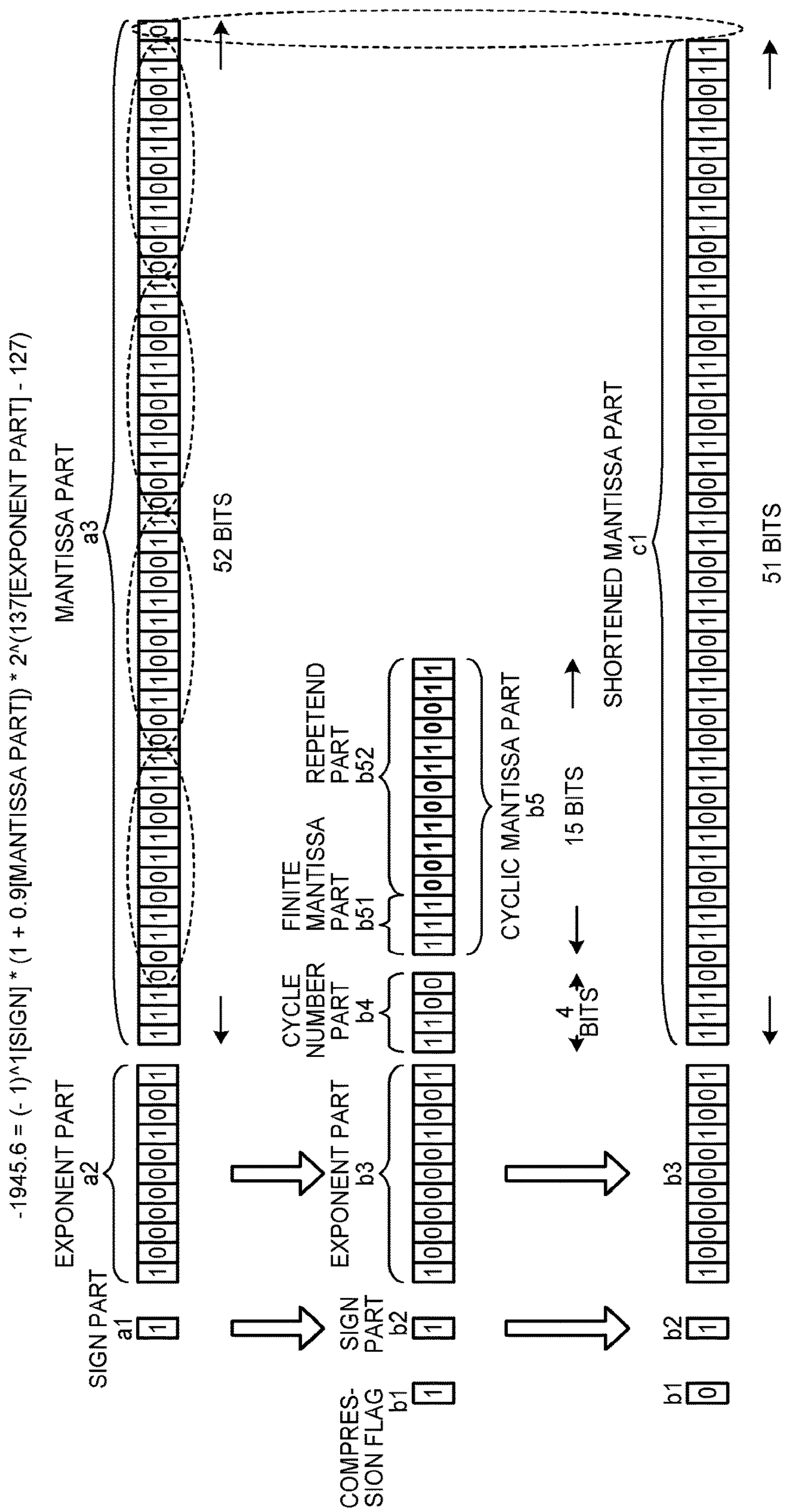
FIG. 2 is a diagram illustrating a compression process of a double precision floating point number according to the embodiment.

FIG. 2 is a diagram illustrating a compression process of a double precision floating point number according to the embodiment.

As illustrated in a top portion of FIG. 2, a double precision floating point number prescribed in IEEE 754 is represented by eight bytes, and is formed of a sign part a1 formed of one bit, an exponent part a2 formed of eleven bits, and a mantissa part a3 formed of 52 bits. In the sign part a1, 0 represents a positive number and 1 represents a negative number. The exponent part a2 is expressed by an expression inflated by 127 in the case of double precision, as an unsigned binary integer. In the mantissa part a3, a value of a fraction part below an integer part is expressed by a binary number.

For example, a decimal numerical value, 1945.6, is expressed by $(-1)^{1(number\ 4)}*(1+0.9\ (number\ 5))*2^{(137\ (number\ 6)-127)}$. In (number 4), a value expressed in the sign part a1 is set in decimal notation, and 1 is set therein in this example. In (number 5), a value expressed in the mantissa part a3 is set in decimal notation, and 0.9 is set therein in this example. In (number 6), a value expressed in the exponent part a2 is set in decimal notation, and 137 is set therein in this example. The double precision floating point number expresses decimal notation of (number 4), (number 5), and (number 6) in binary notation, respectively for the sign part a1, the exponent part a2, and the mantissa part a3. A value of the least significant bit of the mantissa part a3 has a value of a subsequent bit being carried up therein.

In the compression process according to this embodiment, such a double precision floating point number is compressed. In the compression process, a cyclic pattern is extracted from the mantissa part a3 of a bit string representing a numerical value of the double precision floating point number. In the compression process, if a cyclic pattern is extracted, the mantissa part a3 is prescribed by the cyclic pattern and a cycle number indicating a bit number of the cyclic pattern. In the compression process, by use of the prescribed cyclic pattern and cycle number, the mantissa part a3 is compressed.

As illustrated in a middle portion of FIG. 2, if the mantissa part a3 is compressed, the double precision floating point number is represented by four bytes. The double precision floating point number is formed of a compression flag b1 formed of one bit, a sign part b2 formed of one bit, an exponent part b3 formed of eleven bits, a cycle number part b4 formed of four bits, and a cyclic mantissa part b5 formed of 15 bits. A configuration that is the same as the configuration of the double precision floating point number prescribed in IEEE 754 as illustrated in the top portion of FIG. 2 is the sign part b2 and the exponent part b3. A configuration that is different from that of the double precision floating point number prescribed in IEEE 754 is the compression flag b1, the cycle number part b4, and the cyclic mantissa part b5. Of these, a configuration of the compression flag b1 and cycle number part b4 is the same as the configuration of the single precision floating point number, and thus description of the redundant configuration will be omitted. Of these, a bit number of the cyclic mantissa part b5 is different from the configuration of the single precision floating point number. Since the cyclic mantissa part b5 is 15 bits and the cycle number part b4 is four bits, the cycle number part b4 is able to express the largest bit number, 15 (0b1111), of the cyclic pattern expressed by the cyclic mantissa part b5.

In this example, processing in a case where a cyclic pattern, "001100110011", has been extracted from the mantissa part a3 in the compression process will be described. In the compression process, the values of the sign part a1 and the exponent part a2 are respectively set in the sign part b2 and the exponent part b3. In the compression process, "1100", which is a binary representation of 12, which is the bit number of the cyclic pattern, is set in the cycle number part b4. In the compression process, "001100110011", which is the bit string of the cyclic pattern, is set in the repetend part b52. In the compression process, "111", which is the bit string previous to the start of the cyclic pattern, is set in the finite mantissa part b51. In the compression process, "1", which indicates that the double precision floating point number is compressed, is then set in the compression flag b1. Thereby, by the compression process, the double precision floating point number is able to be compressed from eight bytes to four bytes.

As illustrated in a bottom portion of FIG. 2, if the mantissa part a3 is not compressed, the double precision floating point number is represented by eight bytes. The double precision floating point number is formed of the compression flag b1 formed of one bit, the sign part b2 formed of one bit, the exponent part b3 formed of eleven bits, and a shortened mantissa part c1 formed of 51 bits. By illustration with the same reference signs with respect to a configuration that is the same as the configuration of the double precision floating point number that is compressed as illustrated in the middle portion of FIG. 2, description of the redundant configuration will be omitted. A configuration different from the configuration of the double precision floating point number that is compressed is the shortened mantissa part c1. The shortened mantissa part c1 has the least significant bit of the mantissa part a3 dropped off.

Processing in a case where a cyclic pattern is not extracted from the mantissa part a3 in the compression process will now be described. In the compression process, the values of the sign part a1 and the exponent part a2 are respectively set in the sign part b2 and the exponent part b3. In the compression process, since a cyclic pattern is not extracted from the mantissa part a3, a bit string with the least significant bit of the mantissa part a3 having been dropped off is set in the shortened mantissa part c1. In the compression process, "0", which indicates that the double precision floating point number is not compressed, is then set in the compression flag b1. Thereby, in the compression process, even if the double precision floating point number is unable to be compressed, since a configuration shifted from the IEEE 754 format to the right by one bit is obtained, compatibility with the IEEE 754 format is able to be maintained.

Hereinafter, reasons, for making the single precision floating point number into a three byte configuration and the double precision floating point number into a four byte configuration when the floating point numbers are compressed, will be described. The reasons are in consideration of the following (1) to (4). (1) A byte number of a configuration after compression is desirably in bytes. This is for making an input and output time with respect to a data disk short. (2) The byte number of the configuration after the compression is desirably of a fixed length. This is for making a data processing time short. (3) The sign part and the exponent part are not to be compressed. This is for enabling comparison with both of magnitudes of a floating point number of the IEEE 754 format before compression and a floating point number that is unable to be compressed. (4) Precision of the mantissa part is to be maintained as much as possible. This is because if the precision is decreased, an error as the floating point number is increased.

Based on such consideration of (1) to (4), the reasons for making a single precision floating point number into a three byte configuration will be described. Firstly, a byte number of a configuration of a single precision floating point number in the IEEE 754 format is four bytes, and thus, if the consideration of (1) and (2) is reflected, candidates for a byte number of the configuration after compression are one byte, two bytes, and three bytes. Next, if the consideration of (3) is reflected, since the sign part b2 formed of one bit and the exponent part b3 formed of eight bits are left as they are, the one byte configuration is excluded from the candidates of the byte number of the configuration after compression. In addition, in consideration of the compression flag b1 formed of one bit, if the byte number of the configuration after compression is two bytes, the remaining bit number becomes six bits. If the byte number of the configuration after compression is three bytes, the remaining bit number becomes 14 bits. Next, if the consideration of (4) is reflected, in order to precisely express the cyclic mantissa part b5 with the bit number of the cycle number part b4, the two byte configuration with the remaining bit number of six bits is excluded. That is, in consideration of precision after compression, at least three bits (the largest value of the bit number of the repetend part b52 representable by the cycle number part b4: 7) are needed for the cycle number part b4. Then, the two byte configuration with the remaining bit number of six bits is excluded.

As a result, the byte number of the compression after compression is made to be three bytes. Upon the compression into three bytes as a whole, as values maximizing the length of the cyclic mantissa part b5, the cycle number part b4 may be four bits and the cyclic mantissa part b5 may be ten bits. Even if all of the cyclic mantissa part b5, which is ten bits, is used in a cyclic pattern, since the ten bits of the cyclic mantissa part b5 is able to be expressed by the four bits of the cycle number part b4, there is no problem. This is because the cycle number part b4 is able to represent, with the four bits, a bit length of the cyclic pattern of up to 15 (0b1111).

Next, based on the consideration of (1) to (4), the reasons for making a double precision floating point number into a four byte configuration will be described. Firstly, a byte number of a configuration of a double precision floating point number in the IEEE 754 format is eight bytes, and thus, if the consideration of (1) and (2) is reflected, candidates for a byte number of the configuration after compression are one to seven bytes. Next, if the consideration of (3) is reflected, since the sign part b2 formed of one bit and the exponent part b3 formed of eleven bits are left as they are, the one byte configuration is excluded from the candidates of the byte number of the configuration after compression. Next, if the consideration of (4) is reflected, in order to precisely express the cyclic mantissa part b5 with the bit number of the cycle number part b4, the two byte configuration with the remaining bit number of six bits is excluded. That is, in consideration of precision after compression, at least three bits (the largest value of the bit number of the repetend part b52 representable by the cycle number part b4: 7) are needed for the cycle number part b4. As a result, the two byte configuration with the remaining bit number of six bits is excluded. In addition, in consideration of the compression flag b1 formed of one bit, if the byte number of the configuration after compression is three bytes, the remaining bit number becomes eleven bits. If the byte number of the configuration after compression is four bytes, the remaining bit number becomes 19 bits. From the consideration of (4) and the length of the cyclic mantissa part b5 of the single precision floating point number being ten bits, the three byte configuration with the remaining bit number of eleven bits is excluded. This is because, if the mantissa part of the double precision is shorter than the mantissa part of the single precision, precision is unable to be maintained.

As a result, the byte number of the configuration after compression is made to be four bytes. Upon the compression into four bytes as a whole, as values maximizing the length of the cyclic mantissa part b5, the cycle number part b4 may be four bits and the cyclic mantissa part b5 may be 15 bits. Even if all of the cyclic mantissa part b5, which is 15 bits, is used in a cyclic pattern, since the 15 bits of the cyclic mantissa part b5 is able to be represented by the four bits of the cycle number part b4, there is no problem. This is because the cycle number part b4 is able to represent, with the four bits, a bit length of the cyclic pattern of up to 15 (0b1111).

Configuration of Information Processing Apparatus

Figure 3:
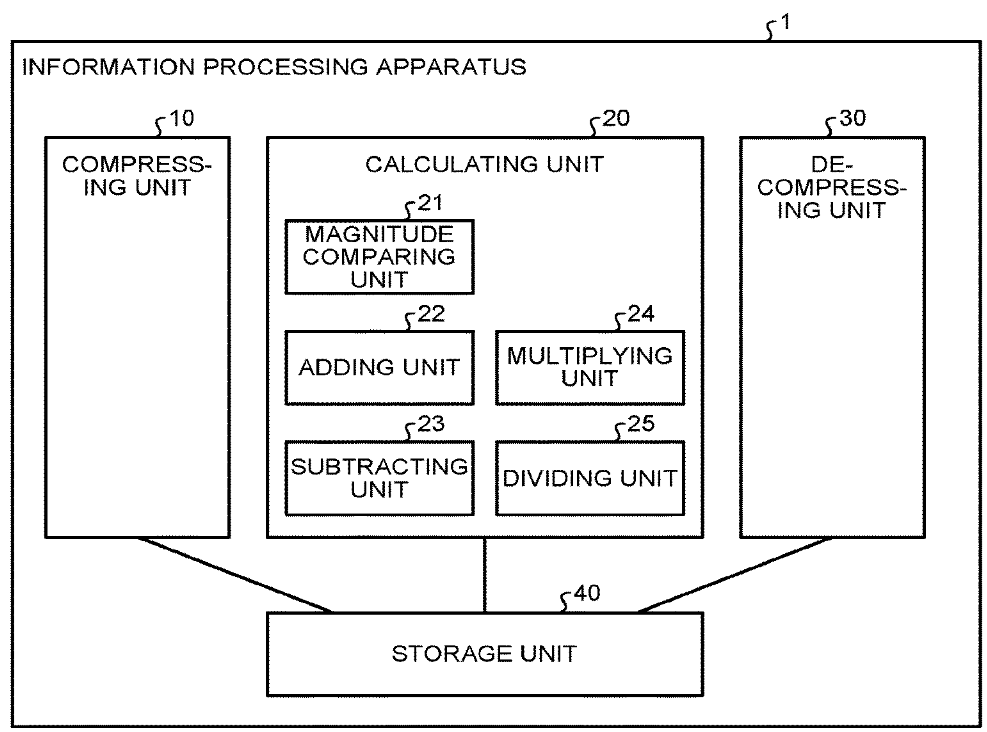
FIG. 3 is a functional block diagram illustrating a configuration of an information processing apparatus according to the embodiment.

FIG. 3 is a functional block diagram illustrating a configuration of an information processing apparatus according to the embodiment. As illustrated in FIG. 3, this information processing apparatus 1 has a compressing unit 10, a calculating unit 20, a decompressing unit 30, and a storage unit 40. The compressing unit 10 is a processing unit that executes the compression processes of floating point numbers as illustrated in FIG. 1, FIG. 2, and the like. The calculating unit 20 executes various types of arithmetic processing among floating point numbers. The decompressing unit 30 executes a decompression process of a floating point number that has been compressed by the compressing unit 10. The compressing unit 10 is an example of a detecting unit and an output unit.

The storage unit 40 stores therein a floating point number of the IEEE 754 format and a floating point number that has been compressed by the compressing unit 10. The storage unit 40 corresponds to a storage device, such as a non-volatile semiconductor memory element, like a flash memory, or an FRAM (registered trademark) (ferroelectric random access memory), for example. Further, the storage unit 40 may correspond to a storage device using a volatile semiconductor memory element, such as a random access memory (RAM), for example.

The compressing unit 10 extracts a cyclic pattern from the mantissa part a3 of a bit string representing a numerical value of a floating point number. If a cyclic pattern has been extracted, the compressing unit 10 prescribes the mantissa part a3 by the cyclic pattern and a bit number (cycle number) of the cyclic pattern. By using the prescribed cyclic pattern and cycle number, the compressing unit 10 compresses the mantissa part a3.

For example, the compressing unit 10 collates bit strings per predetermined unit from the most significant bit of the mantissa part a3. The predetermined unit is a length of the bit string of the cyclic pattern settable in the cyclic mantissa part b5, and an initial value of the predetermined unit is set to be the length of the cyclic mantissa part b5. That is, the initial value of the predetermined unit is "10" for a single precision floating point number and "15" for a double precision floating point number. If the bit strings do not coincide with each other, the compressing unit 10 then shifts a start position of the collation processing in a lower significance direction by one bit. With respect to the predetermined unit, if a value obtained as a result of adding the total number of shifts and the predetermined unit together is equal to or less than the length of the cyclic mantissa part b5, the compressing unit 10 determines that representation by the cyclic mantissa part b5 is possible when the bit strings coincide with each other as a result of the collation processing. The compressing unit 10 then executes collation processing of collating bit strings per predetermined unit from a new start position in the mantissa part a3. With respect to the predetermined unit, if the value obtained as a result of adding the total number of shifts and the predetermined unit together is greater than the length of the cyclic mantissa part b5, the compressing unit 10 determines that representation by the cyclic mantissa part b5 is not possible when the bit strings coincide with each other as a result of the collation processing. The compressing unit 10 then subtracts one bit from the predetermined unit and executes collation processing of collating bit strings per new predetermined unit from the most significant bit of the mantissa part a3. If the bit strings coincide with each other, the compressing unit 10 extracts the coinciding bit string as a candidate for a cyclic pattern. If a fractional portion less than the predetermined unit of the mantissa part a3 coincides with a front portion of the candidate for the cyclic pattern, the compressing unit 10 determines the candidate of the cyclic pattern to be a cyclic pattern. If a cyclic pattern is found, a portion corresponding to a bit number of the cyclic pattern from a bit next to the found cyclic pattern is also a cyclic pattern. The compressing unit 10 then sets a bit string corresponding to the length of the cyclic mantissa part b5 from the most significant bit of the mantissa part a3, into the cyclic mantissa part b5. The compressing unit 10 sets a bit number (cycle number) of the cyclic pattern in the cycle number part b4. That is, the repetend part b52 is a bit string corresponding to a bit number of the cyclic pattern set in the cycle number part b4, from a rear portion of the cyclic mantissa part b5. The finite mantissa part b51 is the remaining bit string of the cyclic mantissa part b5.

Figure 4:
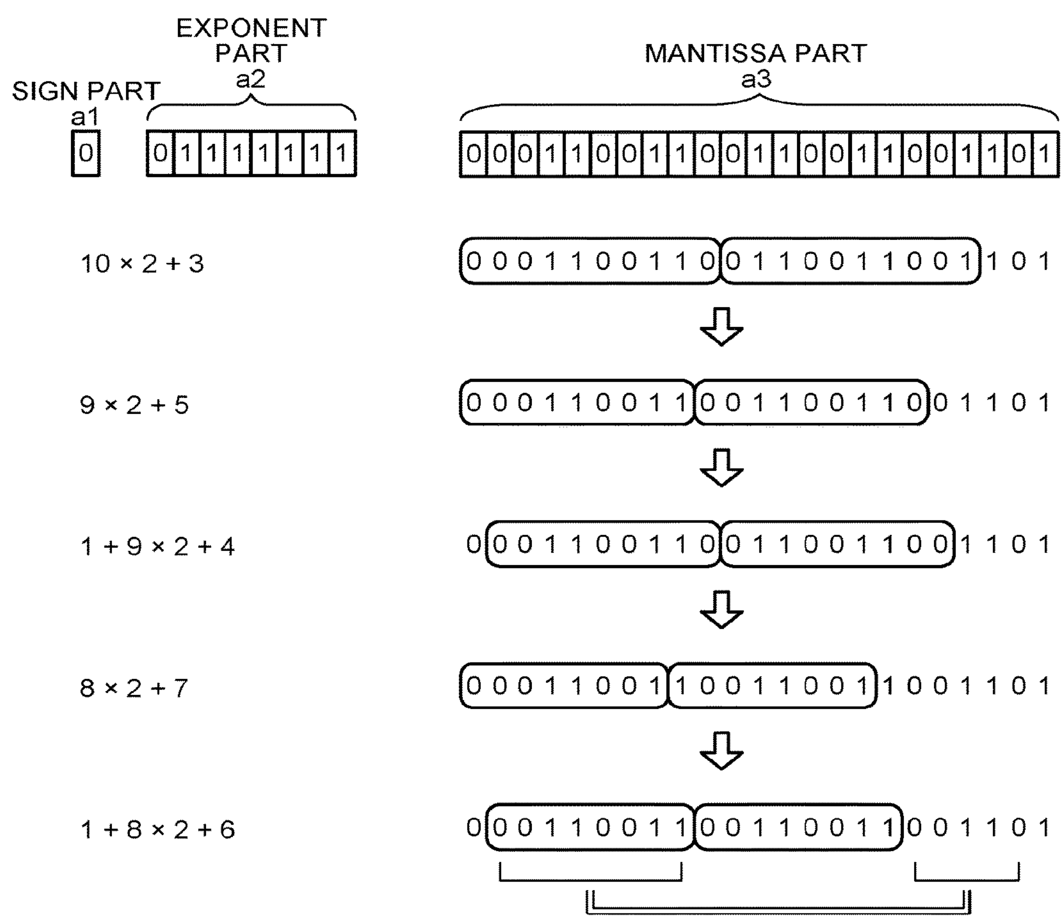
FIG. 4 is a diagram illustrating an example of a compression process.

FIG. 4 is a diagram illustrating an example of the compression process. As illustrated in FIG. 4, an example, in which the compressing unit 10 compresses a numerical value, "1.1", of the IEEE 754 format, will be described. The numerical value, "1.1", is expressed as illustrated in a top portion of FIG. 4, as a single precision floating point number prescribed in IEEE 754. That is, the numerical value, "1.1", is expressed, by "0" as the sign part a1 (one bit), "01111111" as the exponent part a2 (eight bits), and "00011001100110011001101" as the mantissa part a3 (23 bits). The least significant bit of the mantissa part a3 is a value resulting from carry processing.

Since the length of the cyclic mantissa part b5 of the single precision floating point number is ten bits, the compressing unit 10 sets the initial value of the predetermined unit to 10.

The compressing unit 10 collates bit strings per ten bits, which are the predetermined unit, from the most significant bit of the mantissa part a3. That is, this is a case where the mantissa part a3 is separated into ten (bits)×2+3 (bits). In this case, the compressing unit 10 collates ten bits, "0001100110", from the first bit of the mantissa part a3 with subsequent ten bits, "0110011001", but they do not coincide with each other. Therefore, the compressing unit 10 shifts a start position of the collation processing in the lower significance direction by one bit.

Since a value, "11", obtained as a result of addition of the total number of shifts, "1", and the predetermined unit, "10", is larger than the length, "10", of the cyclic mantissa part b5, the compressing unit 10 determines that representation by the cyclic mantissa part b5 is not possible when the bit strings coincide with each other as a result of the collation processing.

The compressing unit 10 then subtracts one bit from the predetermined unit, and collates bit strings from the most significant bit of the mantissa part a3 per nine bits, which are a new predetermined unit. That is, this is a case where the mantissa part a3 is separated into nine (bits)×2+5 (bits). In this case, the compressing unit 10 collates nine bits, "000110011", from the first bit of the mantissa part a3 with subsequent nine bits, "001100110", but they do not coincide with each other. Therefore, the compressing unit 10 shifts a start position of the collation processing in the lower significance direction by one bit.

Since a value, "10", obtained as a result of addition of the total number of shifts, "1", and the predetermined unit, "9", together is equal to or less than the length, "10", of the cyclic mantissa part b5, the compressing unit 10 determines that representation by the cyclic mantissa part b5 is possible when the bit strings coincide with each other as a result of the collation processing.

Therefore, the compressing unit 10 collates bit strings per nine bits, which are the predetermined unit, from a new start position in the mantissa part a3. That is, this is a case where the mantissa part a3 is separated into 1+9 (bits)×2+4 (bits). In this case, the compressing unit 10 collates nine bits, "001100110", from the second bit of the mantissa part a3 with subsequent nine bits, "011001100", but they do not coincide with each other. Therefore, the compressing unit 10 shifts a start position of the collation processing in the lower significance direction by one bit.

Since a value, "11", obtained as a result of addition of the total number of shifts, "2", and the predetermined unit, "9", together is greater than the length, "10", of the cyclic mantissa part b5, the compressing unit 10 determines that representation by the cyclic mantissa part b5 is not possible when the bit strings coincide each other as a result of the collation processing.

Therefore, the compressing unit 10 subtracts one bit from the predetermined unit, and collates bit strings from the most significant bit of the mantissa part a3 per eight bits, which are a new predetermined unit. That is, this is a case where the mantissa part a3 is separated into eight (bits)×2+7 (bits). In this case, the compressing unit 10 collates eight bits, "00011001", from the first bit of the mantissa part a3 with subsequent eight bits, "10011001", but they do not coincide with each other. Therefore, the compressing unit 10 shifts a start position of the collation processing in the lower significance direction by one bit.

Since a value, "9", obtained as a result of addition of the total number of shifts, "1", and the predetermined unit, "8", together is equal to or less than the length, "10", of the cyclic mantissa part b5, the compressing unit 10 determines that representation by the cyclic mantissa part b5 is possible when the bit strings coincide with each other as a result of the collation processing.

The compressing unit 10 then collates bit strings per eight bits, which are the predetermined unit, from a new start position in the mantissa part a3. That is, this is a case where the mantissa part a3 is separated into 1+(bits)×2+6 (bits). In this case, when the compressing unit 10 collates eight bits, "00110011", from the second bit of the mantissa part a3 with subsequent eight bits, "00110011", they coincide with each other. The compressing unit 10 then extracts the coinciding bit string, "00110011", as a candidate for a cyclic pattern.

If a fractional portion of the mantissa part a3 coincides with a front portion of the candidate for the cyclic pattern, the compressing unit 10 determines the candidate for the cyclic pattern to be the cyclic pattern. In this example, since the candidate of the cyclic pattern, "00110011", matches the fractional portion, "00110", the candidate, "00110011", for the cyclic pattern, is determined to be the cyclic pattern. If the cyclic pattern is found, the portion, "01100110", corresponding to a bit number of the cyclic pattern from a bit next to the found cyclic pattern is also the cyclic pattern.

The compressing unit 10 then sets a bit string, "0001100110", corresponding to the length, "10" bits, of the cyclic mantissa part b5 from the most significant bit of the mantissa part a3, into the cyclic mantissa part b5. The compressing unit 10 sets a binary value, "1000", of the bit number, "8", of the cyclic pattern, into the cycle number part b4.

The case where the compressing unit 10 executes compression from the floating point number of IEEE 754 has been described, but not being limited to this case, compression from an original numerical value may be executed. In that case, the compressing unit 10 makes the original numerical value into a floating point number having one bit more than the floating point number of IEEE 754. This is for not causing carry-up of the last bit of the mantissa part a3. The compressing unit 10 may then execute compression by the above described method from the number that has been made into the floating point number.

Returning to FIG. 3, the calculating unit 20 has a magnitude comparing unit 21, an adding unit 22, a subtracting unit 23, a multiplying unit 24, and a dividing unit 25.

The magnitude comparing unit 21 compares magnitudes between values of floating point numbers that have been compressed. Further, the magnitude comparing unit 21 compares magnitudes of a value of a floating point number that has been compressed and a value of a floating point number that has not been compressed. Since comparison is executed according to the calculation method of IEEE 754 in comparison of magnitudes between values of floating point numbers that have not been compressed, description thereof will be omitted.

For example, the magnitude comparing unit 21 compares bits of the sign parts. The magnitude comparing unit 21 determines the value of the floating point number with the bit of the sign part being "1" to be smaller. If the bits of the sign parts are of the same value, the magnitude comparing unit 21 compares bits of the exponent parts. According to the values of the bits of the sign parts, by comparison of bits of the exponent parts from the most significant bits in sequence, the magnitudes are compared. For example, if the bits of the sign parts are "0", and the bits, "1100" and "1000", of the exponent parts are compared, "1100", with the second most significant bit being set, is determined to be larger.

If the bits of the exponent parts are of the same value, the magnitude comparing unit 21 determines whether or not both of the floating point numbers have been compressed.

If both of the floating point numbers have been compressed, the magnitude comparing unit 21 compares bits of the cyclic mantissa parts. According to the values of the bits of the sign parts, by comparison of bits of the cyclic mantissa parts from the most significant bits in sequence, the magnitudes are compared. If the bits of the cyclic mantissa parts are not the same, the magnitude comparing unit 21 determines the value of the floating point number of the larger one to be larger.

If the bits of the cyclic mantissa parts are the same, the magnitude comparing unit 21 compares bits of the cycle number parts. If the bits of the cycle number parts are the same, the magnitude comparing unit 21 determines the values of the floating point numbers that have been compressed are the same. If the bits of the cycle number parts are not the same, the magnitude comparing unit 21 executes comparison after decompression because determination of their magnitudes is not possible.

Hereinafter, an example of comparison of magnitudes in a case where only the cycle number parts are different will be described. According to a data format of a single precision floating point number of IEEE 754 of one of decimal numerical values, "3609880", the sign part a1 is "0", the exponent part a2 is "10011000", and the mantissa part a3 is "00011001100110011001101". According to a data format of the single precision floating point number that has been compressed by the compressing unit 10, the compression flag b1 is "1", the sign part b2 is "0", the exponent part b3 is "10011000", the cycle number part b4 is "1000", and the cyclic mantissa part b5 is "0001100110".

According to a data format of a single precision floating point number of IEEE 754 of the other one of the decimal numerical values, "36923080", the sign part a1 is "0", the exponent part a2 is "10011000", and the mantissa part a3 is "00011001101100110110011". According to a data format of the single precision floating point number that has been compressed by the compressing unit 10, the compression flag b1 is "1", the sign part b2 is "0", the exponent part b3 is "10011000", the cycle number part b4 is "0111", and the cyclic mantissa part b5 is "0001100110".

Between these two numerical values that have been compressed, their compression flags b1, sign parts b2, exponent parts b3, and cyclic mantissa parts b5 are the same, but only the cyclic number parts b4 are different from each other. Before the compression, their most significant 19 bits are the same. Between these two numerical values, the numerical value, "36923080", is larger than the numerical value, "3609880", but the cycle number part b4, "0111", of the numerical value, "36923080", is smaller than the cycle number part b4, "1000", of the numerical value, "3609880". Accordingly, if only the cycle number parts b4 are different from each other, the magnitude comparing unit 21 is unable to determine their magnitudes, and thus executes comparison after decompression.

Further, if not both of the floating point numbers have been compressed, the magnitude comparing unit 21 compares the bits of the cyclic mantissa part b5 with the bits of the mantissa parts a3. By comparison from the most significant bits of the bits of the cyclic mantissa parts b5 and bits of the mantissa parts a3 in sequence, the magnitudes are compared. If the bits of the cyclic mantissa parts b5 and the bits of the mantissa parts are the same, determination of the magnitudes is not possible, and thus the magnitude comparing unit 21 executes comparison after decompression.

The adding unit 22 adds together values of two floating point numbers that have been compressed. If neither of the two floating point numbers has been compressed, the adding unit 22 executes addition according to the calculation method of IEEE 754. Further, if either one of the two floating point numbers has been compressed, after decompressing the floating point number that has been compressed, the adding unit 22 executes addition according to the calculation method of IEEE 754.

For example, the adding unit 22 compares, by use of the magnitude comparing unit 21, magnitudes of values of the two floating point numbers that have been compressed. By using the exponents parts b3 and cycle number parts b4, the adding unit 22 adjusts the value of the exponent part b3 of the smaller number to the value of the exponent part b4 of the larger number, and adjusts values of the cyclic mantissa parts b5. For example, the adding unit 22 subtracts the value of the exponent part b3 of the smaller number from the value of the exponent part b3 of the larger number. If the differential value obtained as a result of the subtraction is 0, or if the differential value is the value of the cycle number part b4 of the smaller number, the adding unit 22 shifts the cyclic mantissa part b5 of the smaller number to the right by the differential value. That is, if the differential value is 0, since the values of the exponent parts b3 are the same, the cyclic mantissa parts b5 have already been adjusted. If the value obtained as a result of the subtraction is the value of the cycle number part b4 of the smaller one, since the exponent of the smaller one is less than that of the larger one by its own cycle number, the adding unit 22 shifts the value of the exponent part b3 to a larger direction (left) by the cycle number to adjust the value to the exponent of the larger one. In addition, the adding unit 22 shifts the value of the cyclic mantissa part b5 to a smaller direction (right) by the cycle number. If the differential value is smaller than the value of the cycle number part b4 of the smaller one, only when the value of the repetend part b52 is 0, the adding unit 22 executes the following processing. That is, the adding unit 22 shifts the value of the exponent part b3 to the larger direction (left) by the differential value to adjust the value to the exponent of the larger one, and shifts the cyclic mantissa part b5 to the smaller direction (right) by the same value.

If the differential value is smaller than the value of the cycle number part b4 of the smaller one and the value of the repetend part b52 is not zero, the adding unit 22 is unable to adjust the cyclic mantissa part b5 and thus may execute addition after decompression.

The adding unit 22 compares the values of the cycle number parts b4 of the two floating point numbers. If the values of the cycle number parts b4 of the two floating point numbers are the same, the adding unit 22 adds together the cyclic mantissa parts b5 of the two floating point numbers. The adding unit 22 executes carry processing of a result of the addition, and finds a value of the exponent part b3 by normalization. If the values of the cycle number parts b4 of the two floating point numbers are not the same, since the cyclic patterns are different from each other and carry processing of the cyclic mantissa part b5 is unable to be executed accurately, the adding unit 22 executes addition after decompression.

The subtracting unit 23 executes subtraction between values of two floating point numbers that have been compressed. If neither of the two floating point numbers has been compressed, the subtracting unit 23 executes subtraction according to the calculation method of IEEE 754. Further, if either one of the two floating point numbers has been compressed, after the floating point number that has been compressed is decompressed, subtraction is executed according to the calculation method of IEEE 754.

For example, by using the magnitude comparing unit 21, the subtracting unit 23 compares magnitudes of values of two floating point numbers that have been compressed. By using the exponent parts b3 and cycle number parts b4, the subtracting unit 23 adjusts the value of the exponent part b3 of the smaller number to the value of the exponent part b3 of the larger number, and adjusts values of the cyclic mantissa parts b5. A method of the adjustment is the same as that by the adding unit 22, and thus description thereof will be omitted.

The subtracting unit 23 compares values of the cycle number parts b4 of the two floating point numbers. If the values of the cycle number parts b4 of the two floating point numbers are the same, the subtracting unit 23 subtracts the cyclic mantissa part b5 of the smaller number from the cyclic mantissa part b5 of the larger number. The subtracting unit 23 executes borrow processing of a result of the subtraction, and finds a value of the exponent part b3 by normalization. If the number to be subtracted from is the smaller number, that is, if the number subtracted therefrom is the larger number, the subtracting unit 23 sets "1" indicating that the value is a negative number, in the sign part b2. If the values of the cycle number parts b4 of the two floating point numbers are not the same, since the cyclic patterns are different from each other and borrow processing of the cyclic mantissa part b5 is unable to be executed accurately, the subtracting unit 23 executes subtraction after decompression.

If floating point numbers to be subjected to multiplication have been compressed, the multiplying unit 24 decompresses the floating point numbers. The multiplying unit 24 executes multiplication of values of the two floating point numbers that have been decompressed, according to the calculation method of IEEE 754.

If the floating point numbers to be subjected to division have been compressed, the dividing unit 25 decompresses the floating point numbers. The dividing unit 25 executes division between values of the two floating point numbers that have been decompressed, according to the calculation method of IEEE 754.

The decompressing unit 30 determines whether or not the compression flag b1 is "1", indicating that the floating point number has been compressed. If the compression flag b1 is "1", the decompressing unit 30 decompresses the cyclic mantissa part b5 by using the cycle number part b4. For example, the decompressing unit 30 sets a bit string that has been set in the cyclic mantissa part b5 from a position of the most significant bit of the mantissa part a3. The decompressing unit 30 additionally sets a bit string corresponding to a bit number of a latter cyclic pattern of the bit string that has been set in the cyclic mantissa part b5, into the mantissa part a3. The decompressing unit 30 then executes carry processing for the last bit of the mantissa part a3. The decompressing unit 30 then sets a bit value of the sign part b2 in the sign part a1. The decompressing unit 30 then sets a bit string of the exponent part b3 in the exponent part a2.

If the decompression flag b1 is not "1", the decompressing unit 30 sets a bit string that has been set in the shortened mantissa part c1 from a position of the most significant bit of the mantissa part a3. The decompressing unit 30 sets 0 or 1 in the last bit of the mantissa part a3. The decompressing unit 30 then sets a bit value of the sign part b2 in the sign part a1. The decompressing unit 30 sets a bit string of the exponent part b3 in the exponent part a2.

Procedure by Compressing Unit

Figure 5:
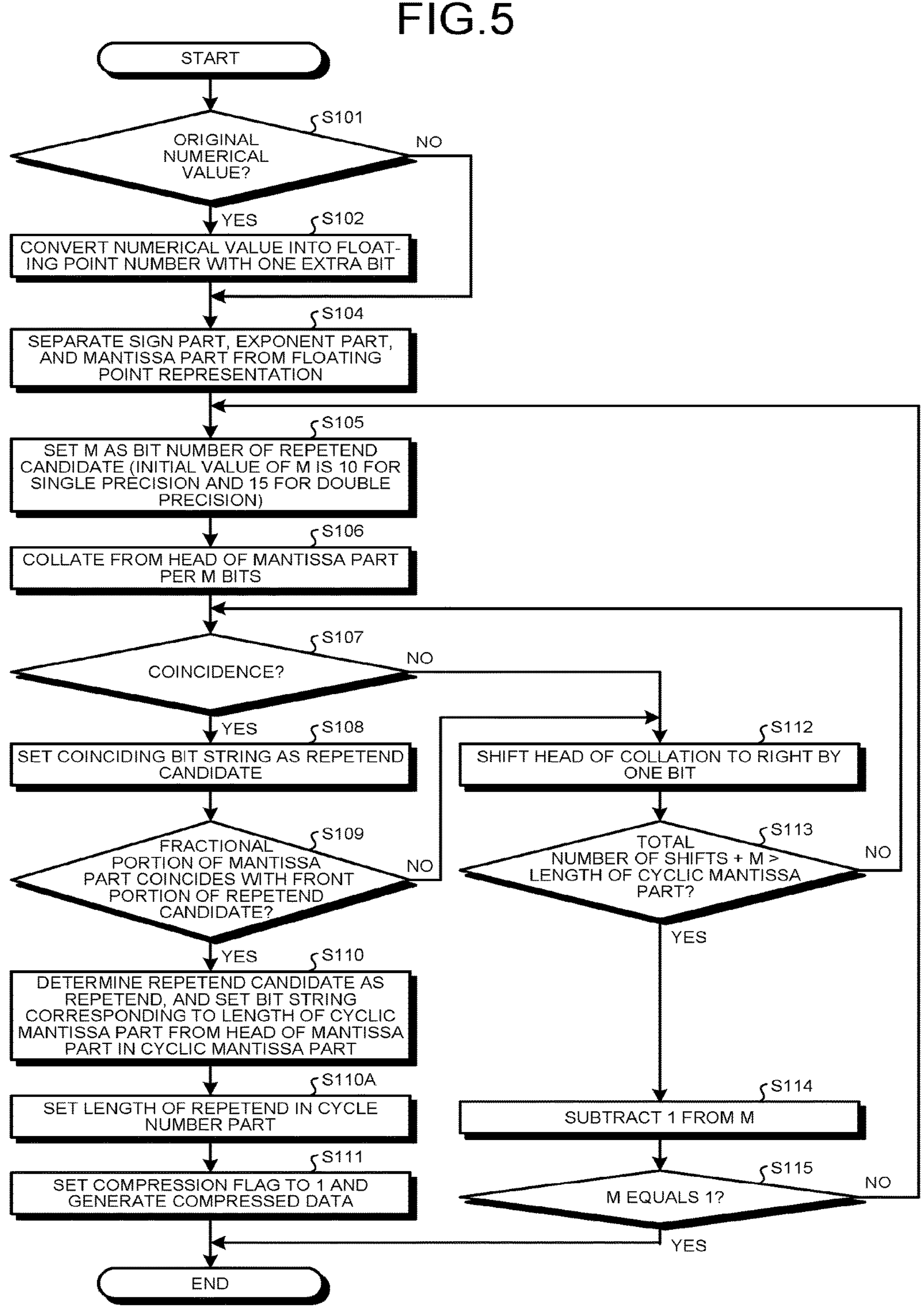
FIG. 5 is a flow chart illustrating a procedure by a compressing unit according to the embodiment.

FIG. 5 is a flow chart illustrating a procedure by the compressing unit according to the embodiment. As illustrated in FIG. 5, the compressing unit 10 determines whether or not a numerical value is original (Step S101). If the numerical value is original (Step S101; Yes), the compressing unit 10 makes the numerical value into a floating point number with one extra bit (Step S102). This is for not causing carry of the last bit of the mantissa part a3. The compressing unit 10 then proceeds to Step S104.

On the contrary, if the numerical value is not original (Step S101; No), the compressing unit 10 proceeds to Step S104. At Step S104, the compressing unit 10 separates the sign part a1, the exponent part a2, and the mantissa part a3 from the floating point representation (Step S104).

Subsequently, the compressing unit 10 sets M as the bit number of a candidate for a cyclic pattern (repetend candidate) (Step S105). An initial value of M is the length of the cyclic mantissa part b5, and is “10” for a single precision floating point number and “15” for a double precision floating point number. The compressing unit 10 then executes collation per M bits from the head of the mantissa part a3 (Step S106).

The compressing unit 10 determines whether or not there is coincidence as a result of the collation processing (Step S107). If there is coincidence as a result of the collation processing (Step S107; Yes), the compressing unit 10 temporarily sets the coinciding bit string as the repetend candidate in the storage unit 40 (Step S108). The compressing unit 10 then determines whether or not a fractional portion of the mantissa part a3 coincides with a front portion of the repetend candidate (Step S109). The compressing unit 10 may ignore the last bit of the fractional portion of the mantissa part a3. This is because a value that has been carried may be set in the last bit of the fractional portion of the mantissa part a3.

If the fractional portion of the mantissa part a3 does not coincide with the front portion of the repetend candidate (Step S109; No), the compressing unit 10 determines that there was no coincidence as a result of the collation processing, and proceeds to Step S112.

On the contrary, if the fractional portion of the mantissa part a3 coincides with the front portion of the repetend candidate (Step S109; Yes), the compressing unit 10 determines the repetend candidate to be the repetend and sets a bit string corresponding to the length of the cyclic mantissa part b5 from the head of the mantissa part a3, into the cyclic mantissa part b5 (Step S110). The compressing unit 10 then set a length of the repetend in the cycle number part b4 (Step S110A). The compressing unit 10 then sets the compression flag b1 to “1”, sets the value of the sign part a1 in the sign part b2, sets the value of the exponent part a2 in the exponent part b3, and generates compressed data (Step S111). The compressing unit 10 then ends the compression process.

At Step S107, if there is no coincidence as a result of the collation processing (Step S107; No), the compressing unit 10 shifts the head of the collation processing to the right by one bit (Step S112). Subsequently, the compressing unit 10 determines whether or not a value obtained as a result of addition of the total number of shifts and M together is greater than the length of the cyclic mantissa part b5 (Step S113).

If the value obtained as a result of addition of the total number of shifts and M together is equal to or less than the length of the cyclic mantissa part b5 (Step S113; No), the compressing unit 10 determines that representation by the cyclic mantissa part b5 is possible when there is coincidence upon collation. The compressing unit 10 then proceeds to Step S107 in order to execute collation processing from the shifted position.

On the contrary, if the value obtained as a result of addition of the total number of shifts and M together is greater than the length of the cyclic mantissa part b5 (Step S113; Yes), the compressing unit 10 determines that representation by the cyclic mantissa part b5 is not possible when there is coincidence upon collation. The compressing unit 10 then subtracts 1 from M (Step S114). The compressing unit 10 determines whether or not M is 1 (Step S115).

If M is not 1 (Step S115; No), the compressing unit 10 proceeds to Step S105 in order to execute collation processing per the new subtracted M. On the contrary, if M is 1 (Step S115; Yes), the compressing unit 10 determines that compression is not possible and ends the compression process.

Procedure by Decompressing Unit

Figure 6:
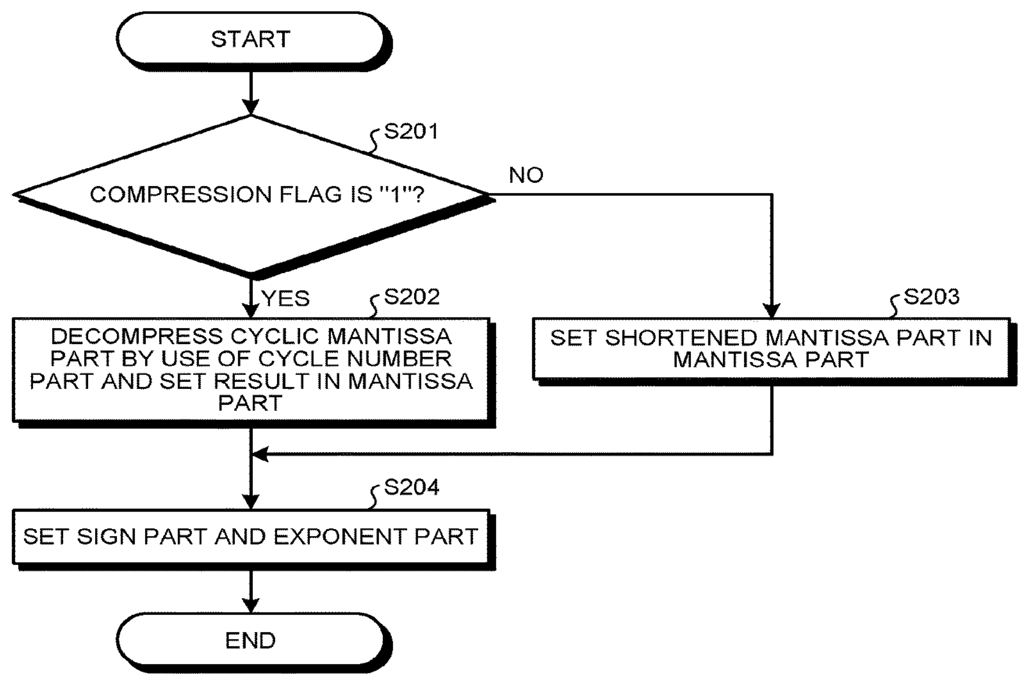
FIG. 6 is a flow chart illustrating a procedure by a decompressing unit according to the embodiment.

FIG. 6 is a flow chart illustrating a procedure by the decompression unit according to the embodiment. In FIG. 6, it is assumed that the decompressing unit 30 has received a floating point number to be decompressed.

As illustrated in FIG. 6, the decompressing unit 30 determines whether or not the received compression flag b1 is “1” (Step S201). If the compression flag b1 is “1” (Step S201; Yes), the decompressing unit 30 decompresses the value of the cyclic mantissa part b5 by using the value of the cycle number part b4 and sets the decompressed bit string in the mantissa part a3 (Step S202). The decompressing unit 30 then proceeds to Step S204.

On the contrary, if the compression flag b1 is not “1” (Step S201; No), the decompressing unit 30 sets the value of the shortened mantissa part c1 in the mantissa part a3 (Step S203). The decompressing unit 30 then proceeds to Step S204.

At Step S204, the decompressing unit 30 sets the value of the sign part b2 in the sign part a1, and sets the value of the exponent part b3 in the exponent part a2 (Step S204). The decompressing unit 30 then ends the decompression process.

Procedure by Magnitude Comparing Unit

Figure 7:
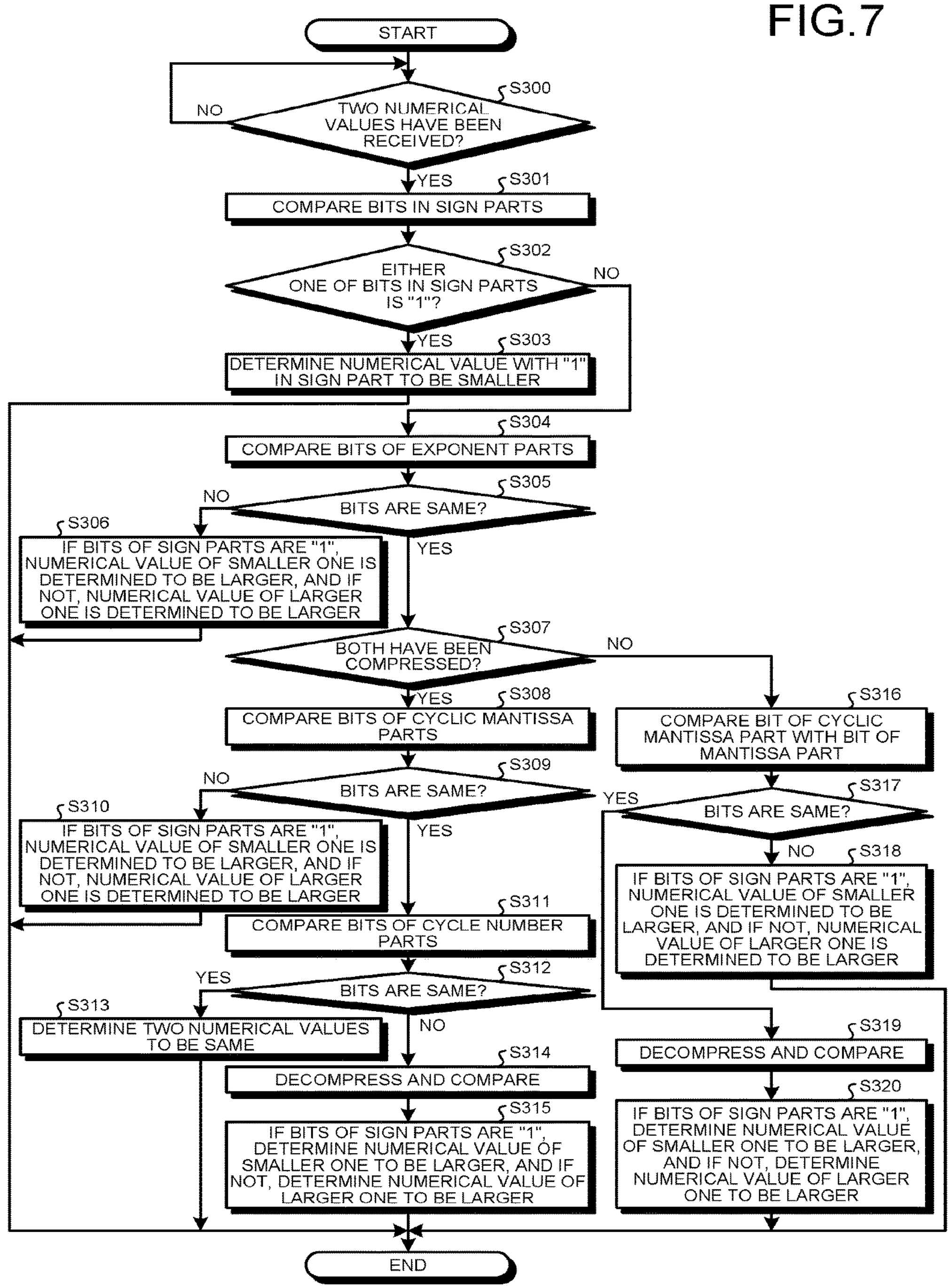
FIG. 7 is a flow chart illustrating a procedure by a magnitude comparing unit according to the embodiment.

FIG. 7 is a flow chart illustrating a procedure by the magnitude comparing unit according to the embodiment. As illustrated in FIG. 7, the magnitude comparing unit 21 determines whether or not two numerical values with magnitudes to be compared with each other have been received (Step S300). If the two numerical values have not been received (Step S300; No), the magnitude comparing unit 21 repeats the determination until the two numerical values are received.

On the contrary, if the two values have been received (Step S300; Yes), the magnitude comparing unit 21 compares the bits of their sign parts b2 (Step S301). The magnitude comparing unit 21 then determines whether or not the bit of the sign part b2 of either one of them is “1” (Step S302). If the bit of the sign part b2 of either one of them is “1” (Step S302; Yes), the magnitude comparing unit 21 determines that the numerical value with the bit of the sign part b2 being “1” to be smaller (Step S303). The bit, “1”, of the sign part b2 indicates that the numerical value is a negative number. The magnitude comparing unit 21 then ends the magnitude comparison process.

On the contrary, if the bit of the sign part b2 of either one of them is not “1” (Step S302; No), that is, if both are “0” or both are “1”, the magnitude comparing unit 21 compares the bits of their exponent parts b3 (Step S304). The magnitude comparing unit 21 then determines whether or not the bits of their exponent parts b3 are the same (Step S305). If the bits of the exponent parts b3 are not the same (Step S305; No), the magnitude comparing unit 21 determines the numerical value of the smaller one to be larger when the bits of the sign parts b2 are “1” and determines that the numerical value of the larger one to be larger when the bits of the sign parts b2 are not “1” (Step S306). The magnitude comparing unit 21 then ends the magnitude comparison process.

On the contrary, if the bits of the exponent parts b3 are the same (Step S305; Yes), the magnitude comparing unit 21 determines whether or not the two numerical values are both numerical values that have been compressed (Step S307). If the two numerical values are both numerical values that have been compressed (Step S307; Yes), the magnitude comparing unit 21 compares the bits of their cyclic mantissa parts b5 (Step S308). The magnitude comparing unit 21 determines whether or not the bits of their cyclic mantissa parts b5 are the same (Step S309). If the bits of the cyclic mantissa parts b5 are not the same (Step S309; No), the magnitude comparing unit 21 determines the numerical value of the smaller one to be larger when the bits of the sign parts b2 are "1" and determines that the numerical value of the larger one to be larger when the bits of the sign parts b2 are not "1" (Step S310). The magnitude comparing unit 21 then ends the magnitude comparison process.

On the contrary, if the bits of the cyclic mantissa parts b5 are the same (Step S309; Yes), the magnitude comparing unit 21 compares the bits of their cycle number parts b4 (Step S311). The magnitude comparing unit 21 determines whether or not the bits of their cycle number parts b4 are the same (Step S312). If the bits of the cycle number parts b4 are the same (Step S312; Yes), the magnitude comparing unit 21 determines that the two numerical values are equal to each other (Step S313). The magnitude comparing unit 21 then ends the magnitude comparison process.

On the contrary, if the bits of the cycle number parts b4 are not the same (Step S312; No), the magnitude comparing unit 21 compares the numerical values by decompressing them because determination of their magnitudes is not possible (Step S314). As a result, if the bits of the sign parts b2 are "1", the smaller numerical value is determined to be larger, and if the bits of the sign parts b2 are not "1", the larger numerical value is determined to be larger (Step S315). The magnitude comparing unit 21 then ends the magnitude comparison process.

At Step S307, if both of the two numerical values are not numerical values that have been compressed (Step S307; No), the magnitude comparing unit 21 compares the bit of the cyclic mantissa part b5 with the bit of the mantissa part a3 (Step S316). The magnitude comparing unit 21 determines whether or not the bit of the cyclic mantissa part b5 and the bit of the mantissa part a3 are the same (Step S317). If the bit of the cyclic mantissa part b5 and the bit of the mantissa part a3 are not the same (Step S317; No), the magnitude comparing unit 21 determines the numerical value of the smaller one to be larger when the bits of the sign parts b2 are "1" and determines the numerical value of the larger one to be larger when the bits of the sign parts b2 are not "1" (Step S318). The magnitude comparing unit 21 then ends the magnitude comparison process.

On the contrary, if the bit of the cyclic mantissa part b5 and the bit of the mantissa part a3 are the same (Step S317; Yes), determination of their magnitudes is not possible, and thus the magnitude comparing unit 21 executes comparison after decompression (Step S319). As a result, if the bits of the sign parts b2 are "1", the smaller numerical value is determined to be larger, and if the bits of the sign parts b2 are not "1", the larger numerical value is determined to be larger (Step S320). The magnitude comparing unit 21 then ends the magnitude comparison process.

Procedure by Adding Unit

Figure 8:
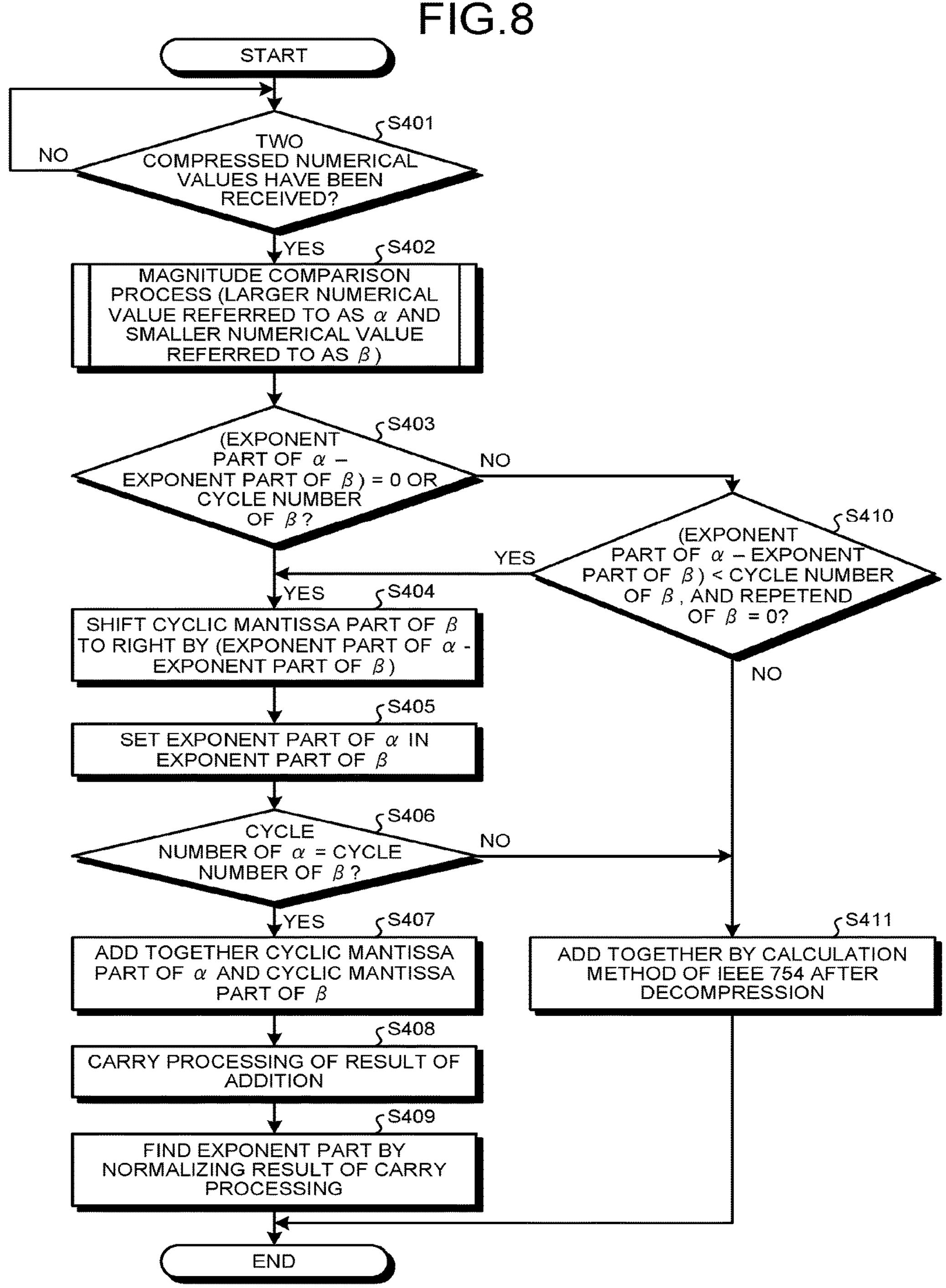
FIG. 8 is a flow chart illustrating a procedure by an adding unit according to the embodiment.

FIG. 8 is a flow chart illustrating a procedure by the adding unit according to the embodiment. As illustrated in FIG. 8, the adding unit 22 determines whether or not two numerical values to be added together have been received (Step S401). If the two numerical values have not been received (Step S401; No), the adding unit 22 repeats the determination until the two numerical values are received.

On the contrary, if the adding unit 22 has received the two numerical values (Step S401; Yes), the magnitude comparison process by the magnitude comparing unit 21 is executed (Step S402). Hereinafter, the larger numerical value will be referred to as α, and the smaller numerical value will be referred to as β.

The adding unit 22 determines whether or not a differential value obtained as a result of subtracting the value of the exponent part b3 of β from the value of the exponent part b3 of α is 0, or the differential value is the cycle number of β (Step S403). If the differential value is 0, or the differential value is the cycle number of β (Step S403; Yes), the adding unit 22 shifts the value of the cyclic mantissa part b5 of to the right by the differential value (Step S404). This is for adjusting the value of the exponent part b3 of β to the value of the exponent part b3 of α. The adding unit 22 then sets the value of the exponent part b3 of α in the exponent part b3 of β (Step S405).

Subsequently, the adding unit 22 determines whether or not the cycle number of α is the same as the cycle number of β (Step S406). If the cycle number of a is not the same as the cycle number of β (Step S406; No), the adding unit 22 determines that addition of the numerical values as compressed is not possible, and proceeds to Step S411.

On the contrary, if the cycle number of α is the same as the cycle number of β (Step S406; Yes), the adding unit 22 adds together the value of the cyclic mantissa part b5 of α and the value of the cyclic mantissa part b5 of β (Step S407). The adding unit 22 executes carry processing of a result of the addition (Step S408). The adding unit 22 finds an exponent by normalizing a result of the carry processing, and sets the found value in the exponent part b3 (Step S409). The adding unit 22 then ends the addition process.

At Step 5403, if the differential value is not 0 and the differential value is not the cycle number of β (Step S403; No), the adding unit 22 determines whether or not the differential value is smaller than the cycle number of β and the value of the repetend of β is 0 (Step S410). If the differential value is smaller than the cycle number of β nand the value of the repetend of β is 0 (Step S410; Yes), the adding unit 22 proceeds to Step S404 in order to match the values of the exponent parts b3.

On the contrary, if the differential value is equal to or greater than the cycle number of β, or if the value of the repetend of β is not 0 (Step S410; No), the adding unit 22 determines that addition of the numerical values as compressed is not possible, and proceeds to Step S411.

At Step S411, the adding unit 22 executes addition by the calculation method of IEEE 754 after executing decompression (Step S411). The adding unit 22 then ends the addition process.

Procedure by Subtracting Unit

FIG. 9 is a flow chart illustrating a procedure by the subtracting unit according to the embodiment. As illustrated in FIG. 9, the subtracting unit 23 determines whether or not two numerical values to be subjected to subtraction have been received (Step S501). If the two numerical values have not been received (Step S501; No), the subtracting unit 23 repeats the determination until the two numerical values are received.

On the contrary, if the subtracting unit 23 has received the two numerical values (Step S501; Yes), the magnitude comparison process by the magnitude comparing unit 21 is executed (Step S502). Hereinafter, the larger numerical value will be referred to as α, and the smaller numerical value will be referred to as β.

The subtracting unit 23 determines whether or not the number to be subtracted from is smaller than the number subtracted therefrom (Step S503). If the number to be subtracted from is smaller than the number subtracted therefrom (Step S503; Yes), since the result of the subtraction will become negative, the subtracting unit 23 sets "1" in the bit of the sign part b2 after the subtraction (Step S504). The subtracting unit 23 then proceeds to Step S505.

On the contrary, if the number to be subtracted from is not smaller than the number subtracted therefrom (Step S503; No), since the result of the subtraction will not become negative, the subtracting unit 23 proceeds to Step S505.

At Step S505, the subtracting unit 23 determines whether or not the differential value obtained as a result of subtracting the value of the exponent part b3 of β from the value of the exponent part b3 of α is 0, or the differential value is the cycle number of (Step S505). If the differential value is 0, or the differential value is the cycle number of β (Step S505; Yes), the subtracting unit 23 shifts the value of the cyclic mantissa part b5 of β to the right by the differential value (Step S506). This is for adjusting the value of the exponent part b3 of β to the value of the exponent part b3 of α. The subtracting unit 23 then sets the value of the exponent part b3 of α in the exponent part b3 of β (Step S507).

Subsequently, the subtracting unit 23 determines whether or not the cycle number of α is the same as the cycle number of β (Step S508). If the cycle number of α is not the same as the cycle number of β (Step S508; No), the subtracting unit 23 determines that subtraction between the numerical values as compressed is not possible, and proceeds to Step S513.

On the contrary, if the cycle number of a is the same as the cycle number of β (Step S508; Yes), the subtracting unit 23 subtracts the value of the cyclic mantissa part b5 of β from the value of the cyclic mantissa part b5 of a (Step S509). The subtracting unit 23 executes borrow processing of a result of the subtraction (Step S510). The subtracting unit 23 finds an exponent by normalizing a result of the borrow processing, and sets the found value in the exponent part b3 (Step S511). The subtracting unit 23 then ends the subtraction process.

At Step S505, if the differential value is not O and the differential value is not the cycle number of β (Step S505; No), the subtracting unit 23 determines whether or not the differential value is smaller than the cycle number of β and the value of the repetend of β is 0 (Step S512). If the differential value is smaller than the cycle number of β and the value of the repetend of β is 0 (Step S512; Yes), the subtracting unit 23 proceeds to Step S506 in order to match the values of the exponent parts b3.

On the contrary, if the differential value is equal to or greater than the cycle number of β or the value of the repetend of β is not 0 (Step S512; No), the subtracting unit 23 determines that subtraction between the numerical values as compressed is not possible and proceeds to Step S513.

At Step S513, the subtracting unit 23 executes the subtraction by the calculation method of IEEE 754 after executing decompression (Step S513). The subtracting unit 23 then ends the subtraction process.

Next, effects of the information processing apparatus 1 according to the embodiment will be described. The information processing apparatus 1 detects, from a partial bit string corresponding to the mantissa part a3 of a bit string corresponding to a floating point number having the sign part a1, the exponent part a2, and the mantissa part a3, a repetitive bit portion, in which repetition of a particular bit pattern is started and a bit arrangement following the sequence of the particular bit pattern continues up to the tail of the partial bit string. The information processing apparatus 1 executes a process of outputting the detected partial bit string, as a compressed bit string, which includes: a bit string of the partial bit string, the bit string excluding a portion from the second repeat of the particular bit pattern; and a bit string identifying a position of a bit string corresponding to the particular bit pattern in the bit string excluding the portion from the second repeat of the particular bit pattern. According to this configuration, the information processing apparatus is able to compress the mantissa part a3 by prescribing the mantissa part a3 with the bit string corresponding to the particular bit pattern and the bit string identifying the position of the bit string. Further, the information processing apparatus 1 is able to execute compression in consideration of post-compression utilization efficiency by compressing the mantissa part a3 while leaving the sign part a1 and the exponent part a2 as they are. For example, the information processing apparatus 1 is able to execute calculation equivalent to that before the compression in their compressed state.

For single precision floating point numbers, the information processing apparatus 1 compresses a four-byte floating point number of the IEEE 754 format into a three-byte floating point number. It is assumed that before compression, one record has 100 bytes and the one record includes 52 bytes of (thirteen) single precision floating point numbers. After compression, since one record includes 39 bytes of (thirteen) single precision floating point numbers, the information processing apparatus 1 is able to make the record length 13 bytes less as compared with that before the compression. If such records are stored in a memory of 4 MB, before compression, from the following equation (1), 41943 records will be stored therein.

$$4\times1024\times1024/100\ \text{(bytes/record)}=41943 \quad (1)$$

In contrast, after the compression, from the following equation (2), 48210 records will be stored therein.

$$4\times1024\times1024/(100-13)\ \text{(bytes/record)}=48210 \quad (2)$$

Therefore, after the compression, the information processing apparatus 1 is able to store records that are 1.1 times that before the compression, into the memory.

For double precision floating point numbers, the information processing apparatus 1 compresses an eight-byte floating point number of the IEEE 754 format into a four-byte floating point number. It is assumed that before compression, one record has 100 bytes and the one record includes 56 bytes of (seven) double precision floating point numbers. After compression, since one record includes 28 bytes of (seven) double precision floating point numbers, the information processing apparatus 1 is able to make the record length 28 bytes less as compared with that before the compression. If such records are stored in a memory of 4 MB, before compression, from the above equation (1), 41943 records will be stored therein. In contrast, after the compression, from the following equation (3), 58254 records will be stored therein.

$$4\times1024\times1024/(100-28)\ \text{(bytes/record)}=58254 \quad (3)$$

Therefore, after the compression, the information processing apparatus 1 is able to store records that are 1.39 times that before the compression, into the memory.

Further, the information processing apparatus 1 according to the embodiment collates bit strings per bit number of a predetermined unit from the most significant bit of the mantissa part a3. If the bit strings do not coincide with each other, the information processing apparatus 1 executes collation processing after shifting a start position of the collation processing in the lower significance direction by one bit. If the bit strings coincide with each other, the information processing apparatus 1 extracts the coinciding bit string as a cyclic pattern. According to this configuration, the information processing apparatus 1 is able to efficiently extract a cyclic pattern of the mantissa part a3.

Further, the information processing apparatus 1 according to the embodiment further executes the following processing if the bit strings do not coincide with each other as a result of the collation processing per bit number of the predetermined unit. The information processing apparatus 1 subtracts one bit from the bit number of the predetermined unit when the numerical value obtained as a result of adding the total number of shifts and the bit number of the predetermined unit exceeds a predefined largest bit number of a cyclic pattern. The information processing apparatus 1 executes collation processing per bit number of a new predetermined unit obtained as a result of the subtraction. According to this configuration, the information processing apparatus 1 is able to preferentially extract a cyclic pattern of a larger bit number by executing collation processing while changing the bit number of the predetermined unit from a larger bit number to a smaller bit number. As a result, the information processing apparatus 1 is able to ensure accuracy of the cycle. That is, the information processing apparatus 1 is able to prevent erroneous extraction of a cyclic pattern upon giving priority to a smaller bit number.

Further, if a request to add together numerical values of two floating point numbers that have been compressed is received and the values of the cycle numbers in the numerical values of the two floating point numbers are the same, the information processing apparatus 1 according to the embodiment adds their cyclic patterns together. According to this configuration, the information processing apparatus 1 is able to execute the addition in their compressed state.

Further, if a request to execute subtraction between numerical values of two floating point numbers that have been compressed is received and the values of the cycle numbers in the numerical values of the two floating point numbers are the same, the information processing apparatus 1 according to the embodiment executes subtraction between their cyclic patterns. According to this configuration, the information processing apparatus 1 is able to execute the subtraction in their compressed state.

Further, the information processing apparatus 1 according to the embodiment executes compression such that the size of the compressed data resulting from compression of a numerical value of a floating point number is in bytes. According to the configuration, by making the compressed data compatible with byte delimitation, the information processing apparatus 1 is able to make input and output with respect to disks and memories fast.

Figure 10:
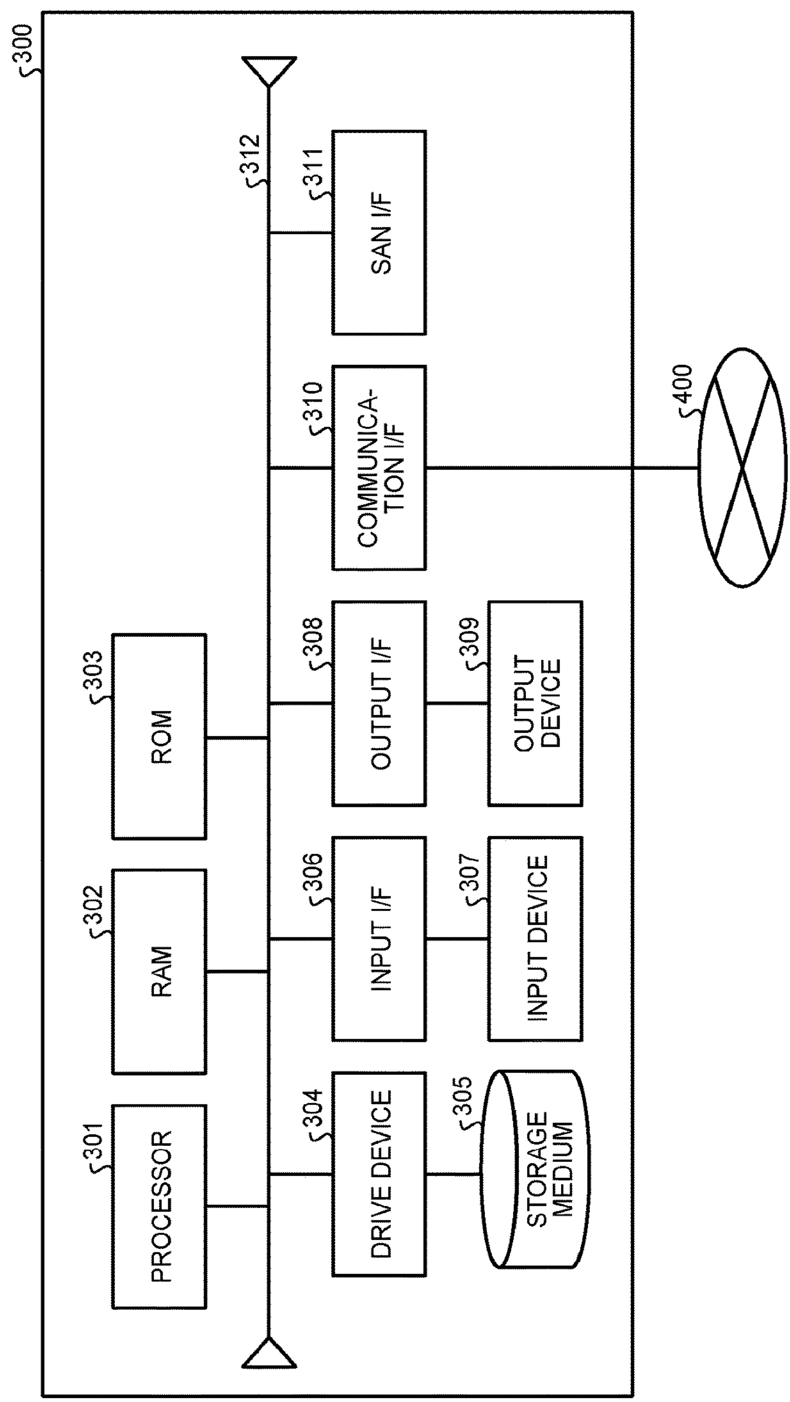
FIG. 10 is a diagram illustrating an example of a hardware configuration of a computer.

Hereinafter, hardware and software used in this embodiment will be described. FIG. 10 is a diagram illustrating an example of a hardware configuration of a computer 300. The computer 300 includes, for example, a processor 301, a random access memory (RAM) 302, a read only memory (ROM) 303, a drive device 304, a storage medium 305, an input interface (I/F) 306, an input device 307, an output interface (I/F) 308, an output device 309, a communication interface (I/F) 310, a storage area network (SAN) interface (I/F) 311, a bus 312, and the like. The respective units of the hardware are connected to one another via the bus 312.

The RAM 302 is a readable and writable memory device, and for example, a semiconductor memory, such as a static RAM (SRAM) or a dynamic RAM (DRAM), or, if not a RAM, a flash memory or the like, is used. The ROM 303 includes a programmable ROM (PROM), or the like. The drive device 304 is a device that executes at least one of reading and writing of information recorded in the storage medium 305. The storage medium 305 stores therein information written by the drive device 304. The storage medium 305 is a storage medium, such as, for example, a hard disk, a flash memory like a solid state drive (SSD), a compact disc (CD), a digital versatile disc (DVD), or a Blu-ray disk. Further, for example, in the computer 300, for each of plural types of storage media, the drive device 304 and the storage medium 305 are provided.

The input interface 306 is a circuit, which is connected to the input device 307, and transmits an input signal received from the input device 307 to the processor 301. The output interface 308 is a circuit, which is connected to the output device 309, and causes the output device 309 to execute output according to an instruction by the processor 301. The communication interface 310 is a circuit, which executes control of communication via the network 400. The communication interface 310 is, for example, a network interface card (NIC), or the like. The SAN interface 311 is a circuit, which executes control of communication with a storage device connected to the computer 300 via a storage area network. The SAN interface 311 is, for example, a host bus adapter (HBA), or the like.

The input device 307 is a device that transmits an input signal according to an operation. The input device 307 is, for example, a key device, such as a keyboard or buttons attached to a main body of the computer 300, and a pointing device, such as a mouse or a touch panel. The output device 309 is a device that outputs information according to control by the computer 300. The output device 309 is, for example, an image output device (display device), such as a display, or a sound output device, such as a speaker. Further, for example, an input and output device, such as a touch screen, is used as the input device 307 and the output device 309. Further, the input device 307 and the output device 309 may be integrated with the computer 300, or may be a device, which is not included in the computer 300 and is connected to the computer 300 from outside, for example.

For example, the processor 301 reads a program stored in the ROM 303 or the storage medium 305 to the RAM 302, and executes the processing of the compressing unit 10, the processing of the calculating unit 20, or the processing of the decompressing unit 30, according to a procedure of the read out program. When that is done, the RAM 302 is used as a work area of the processor 3301. Functions of the storage unit 40 are realized by: the ROM 303 and the storage medium 305 storing therein program files (an application program (AP) 204, middleware (MW) 203, an OS 202, and the like, which will be described later) and various data (for example, floating point numbers); and the RAM 302 being used as the work area of the processor 301. The program read out by the processor 301 will be described by use of FIG. 11.

Figure 11:
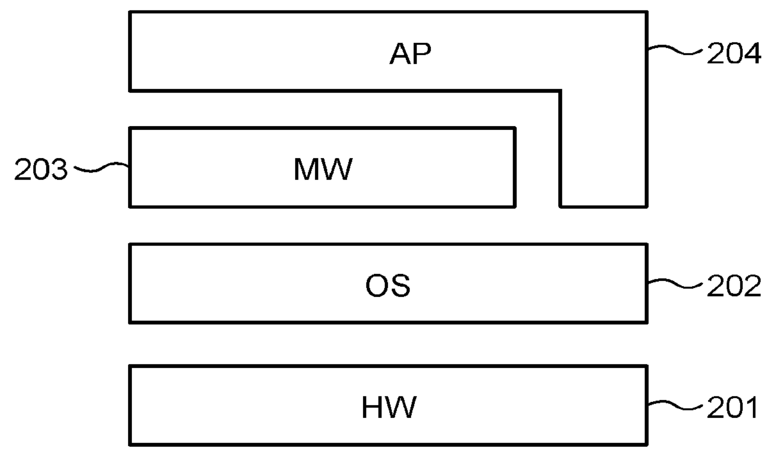
FIG. 11 is a diagram illustrating an example of a configuration of a program that operates on the computer.

FIG. 11 is a diagram illustrating an example of a configuration of the program that operates on the computer. On the computer 300, the OS (operating system) 202, which executes control of a hardware group (HW) 201 (301 to 312) illustrated in FIG. 10, operates. By the processor 301 operating by a procedure according to the OS 202 and control and management of the hardware group 201 being executed, processing according to the application program 204 and middleware 203 is executed by the hardware group 201. Further, in the computer 300, the middleware 203 or application program 204 is read out to the RAM 302 and executed by the processor 301.

When a compressing function is called, the processor 301 executes processing based on at least a part of the middleware 203 or application program 204 and thereby (the hardware group 201 is controlled by the processing based on the OS 202 and) the function of the compressing unit 10 is realized. Further, when a decompressing function is called, the processor 301 executes processing based on at least a part of the middleware 203 or application program 204, and thereby (the hardware group 201 is controlled by the processing based on the OS 202 and) the function of the decompressing unit 30 is realized. Each of the compressing function and decompressing function may be included in the application program 204 itself, or may be a part of the middleware 203 executed by being called according to the application program 204.

Figure 12:
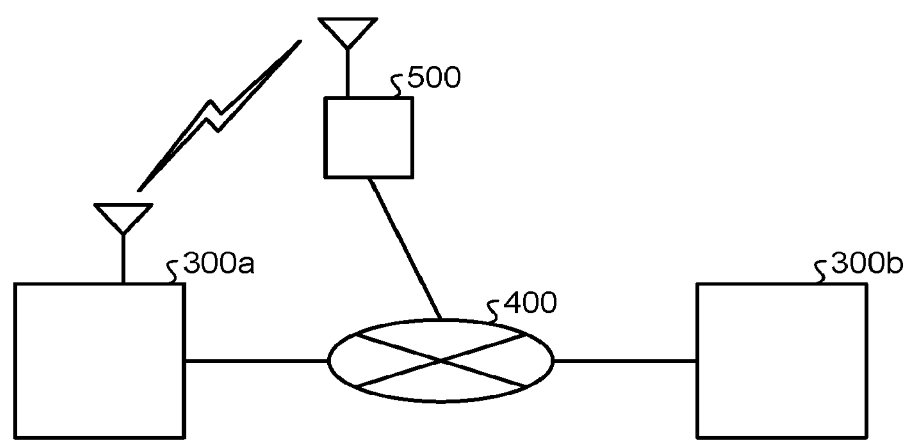
FIG. 12 is a diagram illustrating an example of a configuration of an apparatus in a system of an embodiment.

FIG. 12 illustrates an example of a configuration of an apparatus in a system of an embodiment. The system in FIG. 12 includes a computer 300*a*, a computer 300*b*, a base station 500, and a network 400. The computer 300*a* is connected, via at least one of wireless connection and wired connection, to the network 400, which is connected to the computer 300*b*.

The compressing unit 10 and the decompressing unit 30 illustrated in FIG. 3 may be included in any of the computer 300*a* and the computer 300*b* illustrated in FIG. 12. The computer 300*a* may include the compressing unit 10 and the computer 300*b* may include the decompressing unit 30, or the computer 300*b* may include the compressing unit 10 and the computer 300*a* may include the decompressing unit 30. Further, both of the computer 300*a* and computer 300*b* may include the compressing unit 10 and the decompressing unit 30.

Hereinafter, some of modified examples in the above described embodiments will be described. In addition to the following modified examples, modification of design without departing from the spirit of the present invention may be made as appropriate. In addition to a floating point number that is simply input, a target to be compressed may be a floating point number input from a system, may be a floating point number in a file, or a floating point number stored in a database. For example, a process of compressing a floating point number stored in a database by the above described compression process, updating the database, and the like is executed.

According to an embodiment of the present invention, a bit string of a floating point number is able to be compressed in consideration of post-compression utilization efficiency.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an encoding program that causes a computer to execute a process comprising:

detecting a bit repeating portion in a mantissa part bit string, the mantissa part bit string being a part of a bit string of a floating point number and corresponding to a mantissa of the floating point number, the floating point number having a sign, an exponent, and the mantissa, the bit repeating portion including repetitions of a particular bit pattern up to a tail of the mantissa part bit string; and encoding the bit string of the floating point number into a converted bit string with a first part bit string and a second part bit string, the first part bit string including a sign part bit string, an exponent part bit string, and a part of the mantissa part bit string that exclude a bit string portion after a secondary repetition of the particular bit pattern; the second part bit string specifying the particular bit pattern in the first part bit string.

2. The non-transitory computer-readable recording medium according to claim 1, wherein in the detecting, the computer is caused to execute:

collating bit strings of a first number of bits in the mantissa part bit string, starting from the most significant bit of the mantissa part bit string; and when the bit strings do not coincide, shifting a start position of the bit strings in a lower significance direction by one bit and collating again, and when the bit strings coincide, extracting the bit string as the bit repeating portion.

3. The non-transitory computer-readable recording medium according to claim 2, wherein in the detecting, the computer is further caused to execute:

when the bit strings of the first number of bits in the mantissa part bit string do not coincide, and when a numerical value obtained by adding a total number of shifts and the first number exceeds a maximum bit number of the bit repeating portion, collating bit strings of a second number starting from the most significant bit of the mantissa part bit string, the second number being obtained by subtracting one bit from the first number.

4. The non-transitory computer-readable recording medium according to claim 1, wherein the computer is caused to execute, when a request to add numerical values of two floating point numbers obtained in the encoding is received, and values of the second part bit strings in the two floating point numbers are the same, adding the bit repeating portions of the two floating point numbers.

5. The non-transitory computer-readable recording medium according to claim 1, wherein the computer is caused to execute, when a request to execute subtraction between numerical values of two floating point numbers obtained in the encoding is received, and values of the second part bit strings in the two floating point numbers are the same, executing subtraction between the bit repeating portions of the two floating point numbers.

6. The non-transitory computer-readable recording medium according to claim 1, wherein in the encoding, the computer is caused to make a size of the numerical value of the floating point number obtained as a result of the encoding is in bytes.

7. An encoding apparatus, comprising:

a detecting unit that detects a bit repeating portion in a mantissa part bit string, the mantissa part bit string being a part of a bit string of a floating point number and corresponding to a mantissa of the floating point number, the floating point number having a sign, an exponent, and the mantissa, the bit repeating portion including repetitions of a particular bit pattern up to a tail of the mantissa part bit string; and an executing unit that encodes the bit string of the floating point number into a converted bit string with a first part bit string and a second part bit string, the first part bit string including a sign part bit string, an exponent part bit string, and a part of the mantissa part bit string that exclude a bit string portion after a secondary repetition of the particular bit pattern; the second part bit string specifying the particular bit pattern in the first part bit string.

8. An encoding method comprising:

detecting, by a computer, a bit repeating portion in a mantissa part bit string, the mantissa part bit string being a part of a bit string of a floating point number and corresponding to a mantissa of the floating point number, the floating point number having a sign, an exponent, and the mantissa, the bit repeating portion including repetitions of a particular bit pattern up to a tail of the mantissa part bit string; and encoding, by a computer, the bit string of the floating point number into a converted bit string with a first part bit string and a second part bit string, the first part bit string including a sign part bit string, an exponent part bit string, and a part of the mantissa part bit string that exclude a bit string portion after a secondary repetition of the particular bit pattern; the second part bit string specifying the particular bit pattern in the first part bit string.

* * * * *